US012421919B2

(12) United States Patent
Noftz et al.

(10) Patent No.: US 12,421,919 B2
(45) Date of Patent: *Sep. 23, 2025

(54) INLETS FOR HYPERSONIC AIR-BREATHING VEHICLES AND DESIGN METHODS AND SYSTEMS THEREFOR

(71) Applicants: Purdue Research Foundation, West Lafayette, IN (US); University of Notre Dame du Lac, South Bend, IN (US)

(72) Inventors: Mark Edward Noftz, Villa Park, IL (US); Joseph Stephen Jewell, West Lafayette, IN (US); Andrew James Shuck, Indianapolis, IN (US); Jonathan Poggie, West Lafayette, IN (US); Andrew Nixon Bustard, South Bend, IN (US); Thomas James Juliano, Granger, IN (US)

(73) Assignees: Purdue Research Foundation, West Lafayette, IN (US); University of Notre Dame Du Lac, South Bend, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,513

(22) Filed: Dec. 23, 2023

(65) Prior Publication Data

US 2024/0352907 A1 Oct. 24, 2024

Related U.S. Application Data

(63) Continuation of application No. 18/240,818, filed on Aug. 31, 2023.
(Continued)

(51) Int. Cl.
 *F02K 7/10* (2006.01)
(52) U.S. Cl.
 CPC ..................... *F02K 7/10* (2013.01)

(58) Field of Classification Search
 CPC ........................................................ F02K 7/10
 See application file for complete search history.

(56) References Cited

U.S. PATENT DOCUMENTS

| 4,194,519 A | 3/1980 | Baker et al. |
| 7,207,520 B2 | 4/2007 | Lundy et al. |

(Continued)

FOREIGN PATENT DOCUMENTS

| CN | 101392685 | 3/2009 |
| CN | 101418723 | 4/2009 |

(Continued)

OTHER PUBLICATIONS

Patrick Rodi, "The Osculating Flowfield Method of Waverider Geometry Generation", American Institute of Aeronautics and Astronautics, AIAA-2005-0511, 43rd AIAA Aerospace Sciences Meeting and Exhibit, Reno, Nevada, Jan. 10-13, 2005, pp. 1-7. (Year: 2005).*

*Primary Examiner* — Lorne E Meade
(74) *Attorney, Agent, or Firm* — Hartman Global IP Law; Gary M. Hartman; Domenica N.S. Hartman

(57) ABSTRACT

Systems and methods capable for use in the development of high-speed, shape-transitioning, inward-turning inlets for air-breathing hypersonic vehicles, and inlets formed thereby. The systems and methods preferably provide for designing high-speed inlets for air-breathing hypersonic vehicles, wherein unique solutions are defined in each osculating plane of the inlet. Such systems and methods optionally provide an optimization process for tuning the post throat-shock Mach number of the inlet, and/or designs a shock-capture surface using a parallel-streamlines methodology, and/or a double cowl-lip geometry to allow flow to spill overboard.

12 Claims, 18 Drawing Sheets
(12 of 18 Drawing Sheet(s) Filed in Color)

Related U.S. Application Data

(60) Provisional application No. 63/402,570, filed on Aug. 31, 2022.

(56) References Cited

U.S. PATENT DOCUMENTS

| | | |
|---|---|---|
| 7,568,347 B2 | 8/2009 | Leland et al. |
| 7,866,599 B2 * | 1/2011 | Elvin ................... B64C 30/00 |
| | | 244/53 B |
| 8,256,706 B1 | 9/2012 | Smith et al. |
| 8,292,217 B2 | 10/2012 | Smith et al. |
| 12,134,997 B2 * | 11/2024 | Noftz ................... F02K 7/10 |
| 2013/0213481 A1 | 8/2013 | Drayna et al. |
| 2024/0068427 A1 * | 2/2024 | Noftz ................... B64D 33/02 |

FOREIGN PATENT DOCUMENTS

| | | |
|---|---|---|
| CN | 104908975 | 9/2015 |
| CN | 105775158 | 7/2016 |
| CN | 108331665 | 7/2018 |

* cited by examiner

| Geometry Variables | Symbol |
|---|---|
| Total Contraction Ratio | CR_contour |
| Inlet Aspect Ratio | AR_inlet |
| Inlet Superellipse Exponent | n_inlet |
| Isolator Aspect Ratio | AR_isolator |
| Isolator Superellipse Exponent | n_isolator |
| Leading Edge Deflection Angle(s) | defl_angle |
| Centerbody Radius (iterated) | centerbody_radius |

Table 1. Geometric Inputs for the Inlet Generator

| Flow Variables | Symbol |
|---|---|
| Freestream Mach Number | M_0 |
| Isolator Mach Number(s) | M_iso |
| Ratio of Specific Heats | g |

Table 2. Flow Condition Parameters for the Inlet Generator

| Tolerance Variables | Symbol |
|---|---|
| Streamline Tolerance | TOL.Mpm |
| Geometric Tolerance | TOL.R |
| Isolator Mach Tolerance | TOL.M3 |
| Smoothing Iterations (max) | z_sm |

Table 3. Tolerance Input Variables for the Inlet Generator

| Discretization Variables | Symbol |
|---|---|
| Number of Osculating Planes | nn-1 |
| Batch Number | batch_num |
| ODE Step Size | step |
| Max Array Size | save |
| Lower Surface Flat Size | plotn |

Table 4. Discretization Input Variables for the Inlet Generator

FIG. 9

| Inlet Name | User Inputs | Increasing Effect | Decreasing Effect |
|---|---|---|---|
| Unoptimized Baseline | Default Values | - | - |
| Optimized v1 | $M_3 = 3$ | CR, $P_{throat}/P_\infty$ | Length, ICR |
| Optimized v2 | $M_3 = 3$, OC = 2.6 | $P_{throat}/P_\infty$ | Length, ICR, CR |
| Optimized v3 | $M_3 = 3$, δ = 8° | CR, $P_{throat}/P_\infty$ | Length, ICR |
| Optimized v4 | $M_3 = 3$, CR = 10 | Length, ICR, CR, $P_{throat}/P_\infty$ | - |
| Optimized v5 | $M_3 = 3.5$ | Length, ICR, $P_{throat}/P_\infty$ | CR, $P_{throat}/P_\infty$ |

Table 5. Input Parameters and Resulting Effect for the Inlet Family

FIG. 9 (cont'd)

INLETS FOR HYPERSONIC AIR-BREATHING VEHICLES AND DESIGN METHODS AND SYSTEMS THEREFOR

CROSS-REFERENCE TO RELATED APPLICATIONS

This application is a continuation of U.S. patent application Ser. No. 18/240,818 filed Aug. 31, 2023, which claims the benefit of Provisional U.S. Patent Application No. 63/402,570 filed Aug. 31, 2022. The contents of these prior patent document are incorporated herein by reference.

STATEMENT REGARDING FEDERALLY SPONSORED RESEARCH OR DEVELOPMENT

This invention was made with government support under FA8650-20-2-2405 awarded by the Air Force Research Laboratory. The government has certain rights in the invention.

BACKGROUND OF THE INVENTION

The present invention generally relates to inlets and intakes for capturing and compressing freestream air for combustion within an engine. The invention particularly relates to systems and methods for the development of high-speed, shape-transitioning, inward-turning inlets and intakes for air-breathing hypersonic vehicles, and to inlets and intakes formed thereby.

Devices that capture and compress freestream air for combustion within an engine are commonly referred to as inlets or intakes (hereinafter, collectively referred to as inlets). High speed inlets are a fundamental part of air-breathing engine development. Air-breathing hypersonic vehicles are especially sensitive to the inflow state of captured air and generated shock structure from the inlet surface. These inlets are usually molded onto aircraft structures and bodies, which means they transition from a forward capture shape to a given downstream isolator shape. Inlets for air-breathing hypersonic vehicles must also operate and start effectively. For these instances, an inlet's self-startability becomes important for resiliency. As such, the development of inlets and their operability are vital to all downstream components in hypersonic vehicles and other air-breathing systems.

Air intakes are a fundamental part of all high speed airbreathing propulsion concepts. The main purpose of an intake is to capture and compress freestream air for the engine. At hypersonic speeds, the intake's surface and shock structure effectively slow the airflow through ram-air compression. In supersonic-combustion ramjets, the captured airflow remains supersonic and generates complicated shock structures. The design of these systems requires careful evaluation of proposed operating conditions and relevant aerodynamic phenomena. The physics of these systems, such as the intake's operability range, mass capture efficiency, back-pressure resiliency, and intake unstart margins are all open areas of research.

Design and testing of inlets to evaluate their core objectives—to capture and compress freestream air—are complicated by the physics of compressible gas dynamics. To reduce risk and uncertainty in performance, flight test systems have primarily used axisymmetric outward-turning isentropic spikes or two-dimensional ramp inlets. The academic literature contains numerous studies that focus on these simple geometries to hone in on specific phenomena.

Although easy to analyze, two-dimensional ramp and axisymmetric intakes lack compression efficiency and usually incorporate a high amount of on-design spillage. Additionally, these intakes often feed directly into rectangular isolators, which are less structurally efficient and have higher drag and cooling requirements than round designs. Therefore, it would be desirable to create a three-dimensional intake capable of creating a uniform flow into an elliptical or circular isolator.

Shape-transitioning inlets and inward-turning inlets, although not as widely studied, provide several advantages over axisymmetric outward-turning and two-dimensional ramp inlet designs. Shape-transitioning (shape-transitioned) inlets can be molded onto fuselages of conceptual and radical design concepts. Inward-turning inlets are shorter than comparable two-dimensional inlets for the same designed compression ratio and spill less airflow than two-dimensional designs. Because contraction ratios and mass capture efficiencies of inward-turning inlets are higher, the starting characteristics of the intake become problematic at off-design conditions. Inward-turning designs often have to account for unfavorable starting scenarios by incorporating area relief, spill notches, and less aggressive internal contraction ratios. Still, merging shape-transitioning inlet and inward-turning inlet design concepts would have the potential to enable design engineers to retain the advantages of both ideas, significantly improving the capability of future systems.

A first step to designing an intake is to select a parent flowfield that will capture freestream air and compress it to the desired static pressure and Mach number. One such parent flowfield is the classic Busemann diffuser whose axisymmetric flowfield is capable of very efficient compression at supersonic Mach numbers. Though efficient, the overall length of a Busemann diffuser poses structural, drag, machinability, and heat transfer concerns, and the intake is usually truncated to rectify these issues as well as reduce stagnation pressure recovery. However, simply truncating the intake at a certain point results in a curved leading-edge shock, which negatively impacts flow uniformity and results in flow distortion. Therefore, it is desirable to have a straight leading-edge shock. A different conical flowfield solved from the Taylor-Maccoll equations rectifies this issue. This approach, known as the internal conical flow A (ICFA) solution, solves a conical flow contour downstream of a leading oblique shock wave. The ICFA contour can be stitched to a truncated Busemann intake to create a base flowfield, termed the internal conical flow C (ICFC), that is highly efficient while retaining excellent flow uniformity.

Although the ICFC flowfield is capable of satisfying intake requirements related to preparing the flow for combustion, it fails to allow for intake starting for more than very mild contraction ratios. Intake unstart can be caused by many mechanisms; large vehicle attitudes, high backpressure, and high contraction ratios in the intake are all common unstarting mechanisms. For intake design, an estimate for the starting contraction limit for the over-compression mechanism is given by the Kantrowitz criterion, which for the minimum intake exit-to-capture ratio is 0.63 for a weak throat shock in a high-efficiency configuration operating at Mach 6. This, however, is considerably higher than the ratio given by the classical Busemann- and ICFC-style flowfields for any significant compression at high Mach numbers. Therefore, a technique has to be used to reduce the contraction of these highly efficient base flowfield types.

Stream-tracing techniques have gained considerable attention as methods to design shape-transitioned intakes.

Many inward-turning inlet designs can trace their lineage back to methodologies for designing streamline-traced planar and axisymmetric inlets for hypersonic air-breathing engines. Billig et al., "Streamline Tracing: Technique for Designing Hypersonic Vehicles," Journal of Propulsion and Power, Vol. 16, No. 3, May-June 2000, and Billig et al., "Design and Analysis of Streamline Traced Hypersonic Inlets," 9th International Space Planes and Hypersonic Systems and Technologies Conference and 3rd Weakly Ionized Gases Workshop," 1-5 Nov. 1999, Norfolk VA. The methods used by Billig et al. solved the Taylor-Maccoll equations for the Busemann solution. The solution is an inviscid streamline that generates a converging, conical flowfield. The streamline is then scaled to fit within the inner and outer limits of some defined shape. Although the shape was a design variable, it was not a true shape-transitioning inlet design because the inlet and exit shapes had to match. Nevertheless, the geometry could create inlets that sported cowl cut-backs that improved startability. Streamline-tracing techniques can also provide ways to relieve the internal contraction ratio (ICR) of the original axisymmetric parent flowfields.

During a design process utilizing a stream-tracing technique, a capture shape and an isolator exit shape are defined. If necessary, several intermediary shapes can be defined to enhance the shape-transitioning process. Smart, "Design of Three-Dimensional Hypersonic Inlets with Rectangular-to-Elliptical Shape Transition," Journal of Propulsion and Power, Vol. 15, No. 3, May-June 1999, and Smart, "Experimental Testing of a Hypersonic Inlet with Rectangular-to-Elliptical Shape Transition," Journal of Propulsion and Power, Vol. 17, No. 2, March-April 2001. Smart used an empirical function to blend two or more streamlines together. Matching two or more streamlines from the parent flowfield to follow the inner and outer radii creates an intake that allows for mass spillage when operating off-design and a relieved ICR that satisfies the starting conditions. The blending of streamlines is a fundamentally geometric technique that is an averaged combination of several different compression streamlines. This makes the final surface definition hard to analyze analytically and necessitates computational fluid dynamics (CFD) and experimental verification of the resulting flowfield.

The above-noted inlet design methods rely on scaling one Busemann Diffuser solution (untruncated/truncated) to create an inward-turning geometry. Certain shape-transitioning inlet design methods also use streamline morphing of two or more Busemann Diffuser solutions to create inlet geometries. Such inlet designs may include a notch or cowl-lip (hereinafter, cowl notch) that allows flow to spill overboard, which is important for downstream requirements in an air-breathing engine.

A more recent method utilizing osculating axisymmetric planes (OAPs) allows designers to create complex three-dimensional (3-D) wavecatcher intake geometries based on multiple two-dimensional (2-D) solutions of the chosen parent flowfield. The osculating axisymmetric (OA) theory of stream tracing follows an aerodynamic transition by solving unique parent flowfields for each defined radial slice of an intake. The two-dimensional parent flowfields also contain their own unique origin points and centers of curvature. Historically, this method has been applied to the design of high-speed waveriders, but has also been applied to the design of several three-dimensional, high-speed, and shape-transitioned intakes. The OA theory solves a conical flowfield in discrete slices (osculating planes (OPs)) that are assumed to be irrotational. In order for this assumption to hold, the leading-edge oblique shocks must remain at constant strength across the azimuthal domain. The theory has been successful at determining the external shockwave shapes over arbitrarily defined hypersonic waverider geometries. The method solved the Taylor-Maccoll equations for external flow over a cone. In addition to a streamwise body contour and shockwave shape, the analytical pressures were verified with CFD calculations. When applied to inlets, osculating axisymmetric theory can create shape-transitioning inlets with conical flowfields generated from multiple unique Busemann contours.

Advantages of utilizing OAP include higher on-design mass capture, higher total pressure recovery, and finer control of the intake's aerodynamic properties. Viscous effects on shock angles, flow constriction due to boundary-layer growth, and flow separation can all reduce the uniformity of intake exit flow. Boundary-layer separation drastically reduces efficiency while increasing the chances of unstart. It is, therefore, imperative to account for viscous effects in the design of an intake. To offset the constriction and change in effective geometry by the presence of a boundary layer, a full viscous simulation of the intake can be run and the geometry can be offset by the local displacement thickness. Flow separation, which is a product of adverse pressure gradients, should be minimized as much as possible. Nonetheless, if the shock train system creates large adverse pressure gradients, it is critical to investigate flow separation at walls where the shock impingement occurs.

Notwithstanding the above, there are certain limitations or shortcomings associated with existing inlet design techniques for hypersonic air-breathing vehicles, including less efficiency in terms of complexity of use and the resulting designs as they rely on scaling one Busemann Diffuser solution (untruncated/truncated) to create an inward-turning geometry. Therefore, it would be desirable if inlet design methods were available that were capable of at least partly overcoming or avoiding the limitations or shortcomings associated with existing inlet design.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, systems and methods capable for use in the development of high-speed, shape-transitioning, inward-turning inlets for air-breathing hypersonic vehicles, and to inlets formed thereby.

According to a nonlimiting aspect of the invention, the systems and methods provide for designing high-speed inlets for air-breathing hypersonic vehicles, wherein unique solutions are defined in each osculating plane of the inlet. Such systems and methods optionally provide an optimization process for tuning the post throat-shock Mach number of the inlet, and/or designs a shock-capture surface using a parallel-streamlines methodology, and/or a double cowl-lip geometry to allow flow to spill overboard.

Technical aspects of systems and methods having features as described above preferably include the capability of their use for designing hypersonic air-breathing inlets, which preferably have the ability to be designed to operate in an on-design mode for a given freestream Mach number with a shock-on-lip condition, stitching together unique osculating solutions to form a three-dimensional inlet shape that allows for minimal flow spillage.

Other aspects and advantages will be appreciated from the following detailed description as well as any drawings.

BRIEF DESCRIPTION OF THE SEVERAL VIEWS OF THE DRAWING

The patent or application file contains at least one drawing executed in color. Copies of this patent or patent application publication with color drawing(s) will be provided by the Office upon request and payment of the necessary fee.

FIG. 9 contains Tables 1 through 5, which list inputs, parameters, and variables utilized in investigations relating to nonlimiting aspects of the invention.

DETAILED DESCRIPTION OF THE INVENTION

Figure 1A:
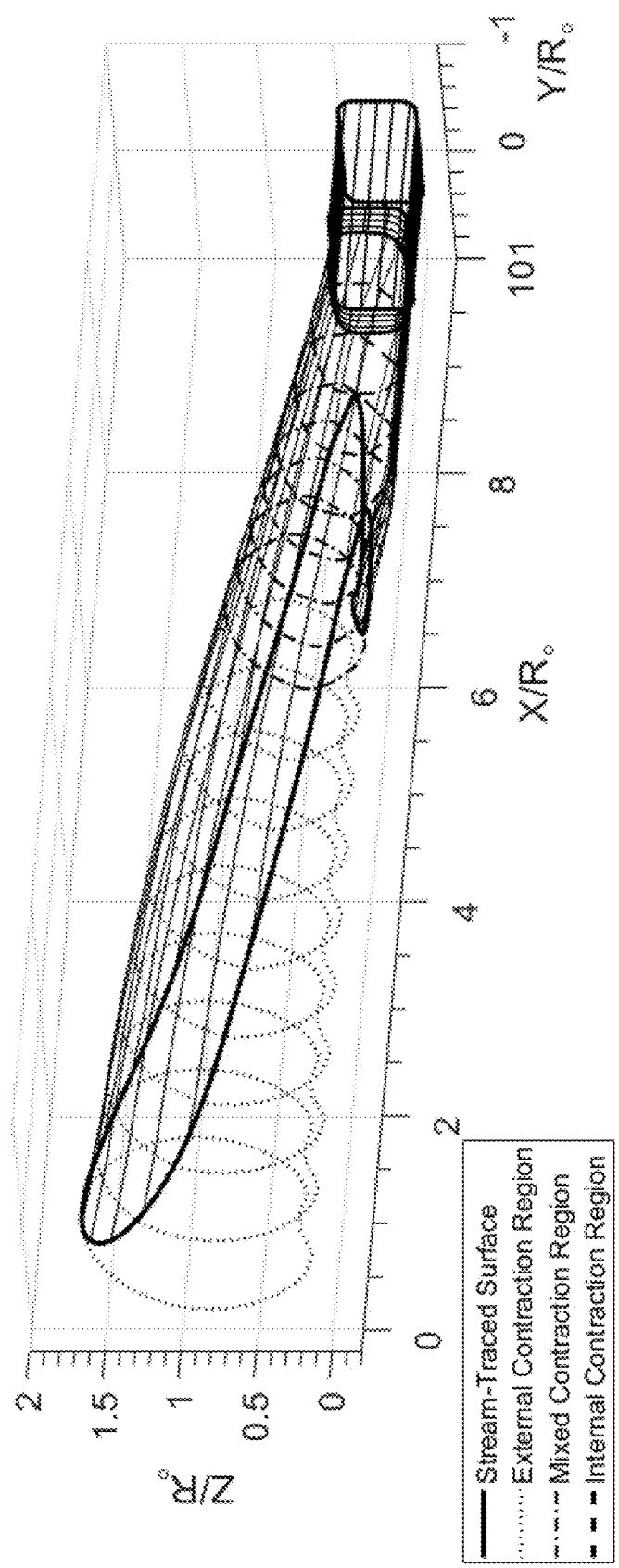
FIGS. 1A through 1D graphically represent perspective, front, side, and top views of an embodiment of an inlet shape in accordance with a nonlimiting aspect of the invention.
Figure 1B:
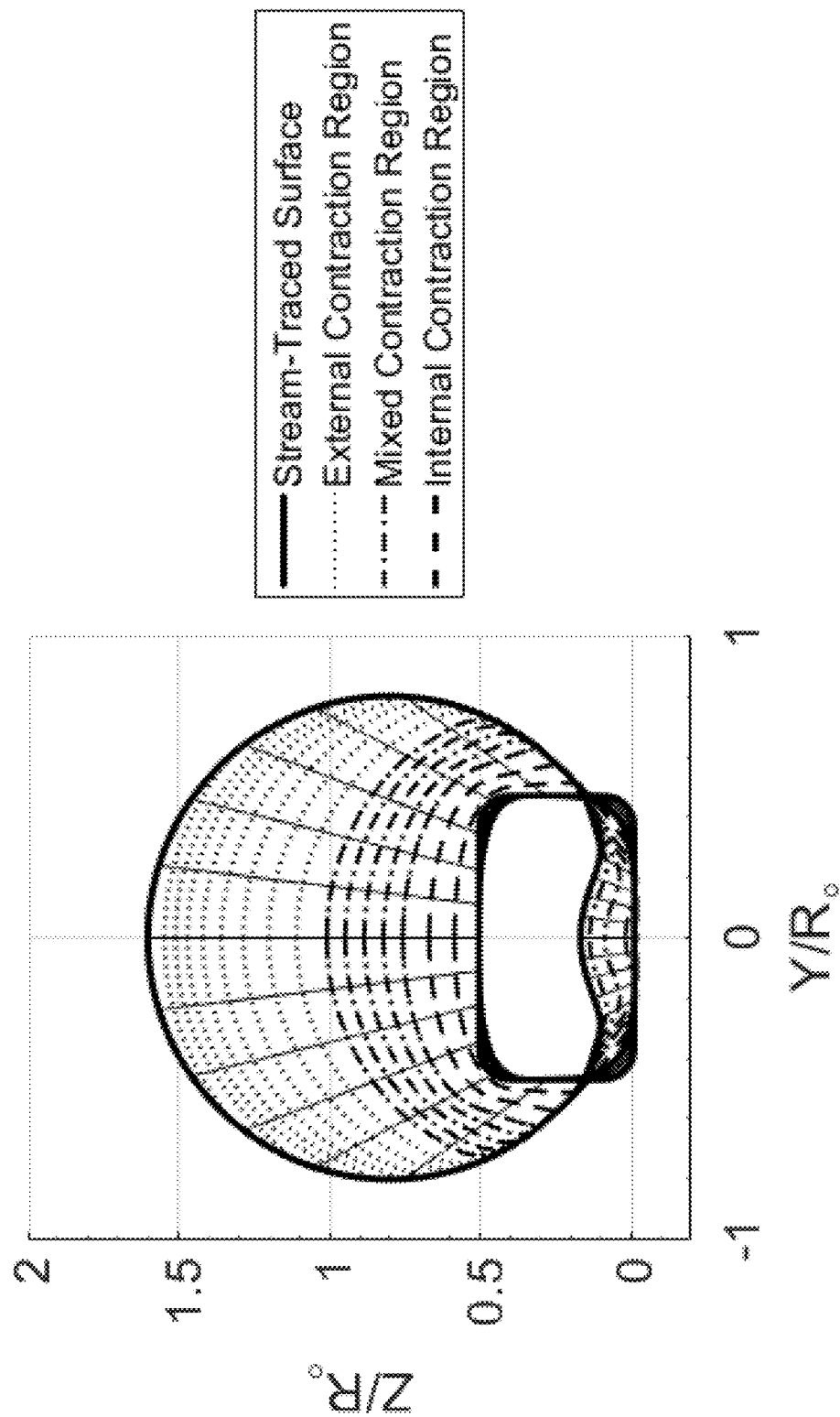
Figure 1C:
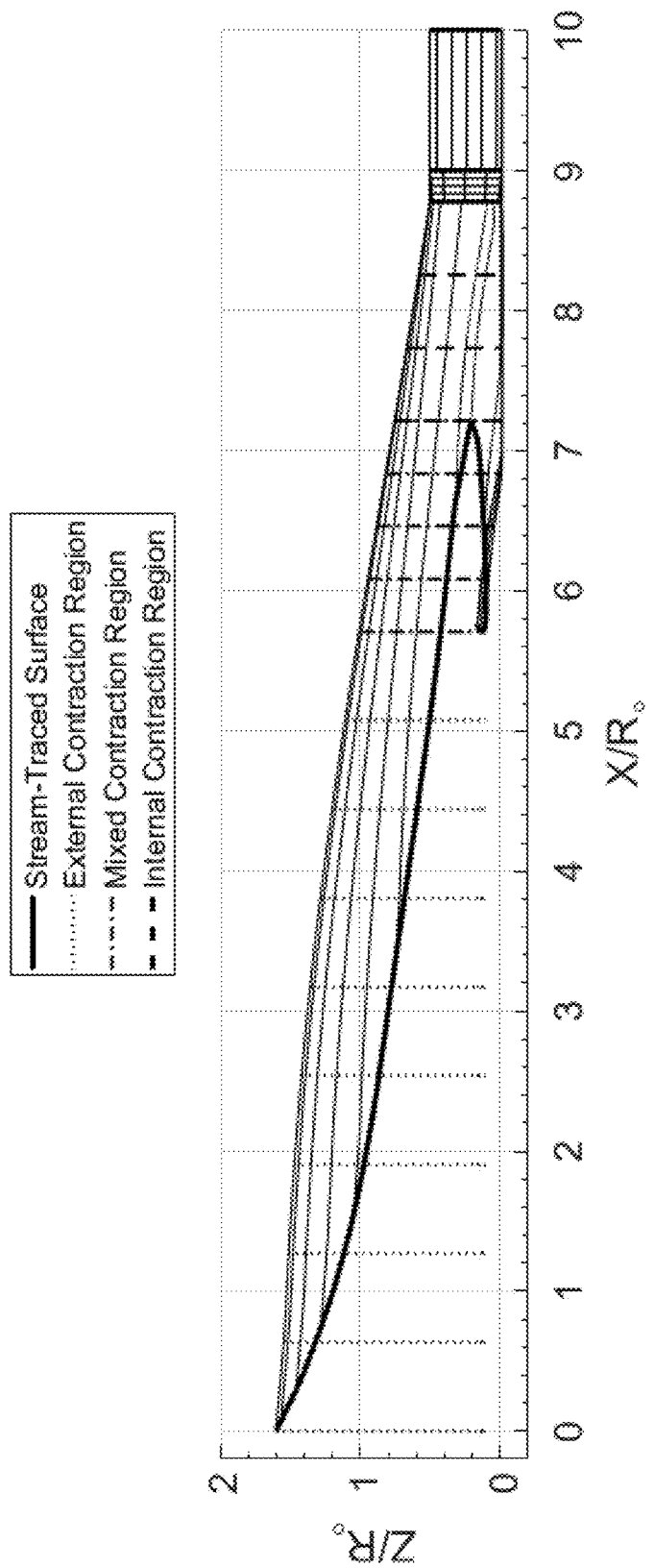
Figure 1D:
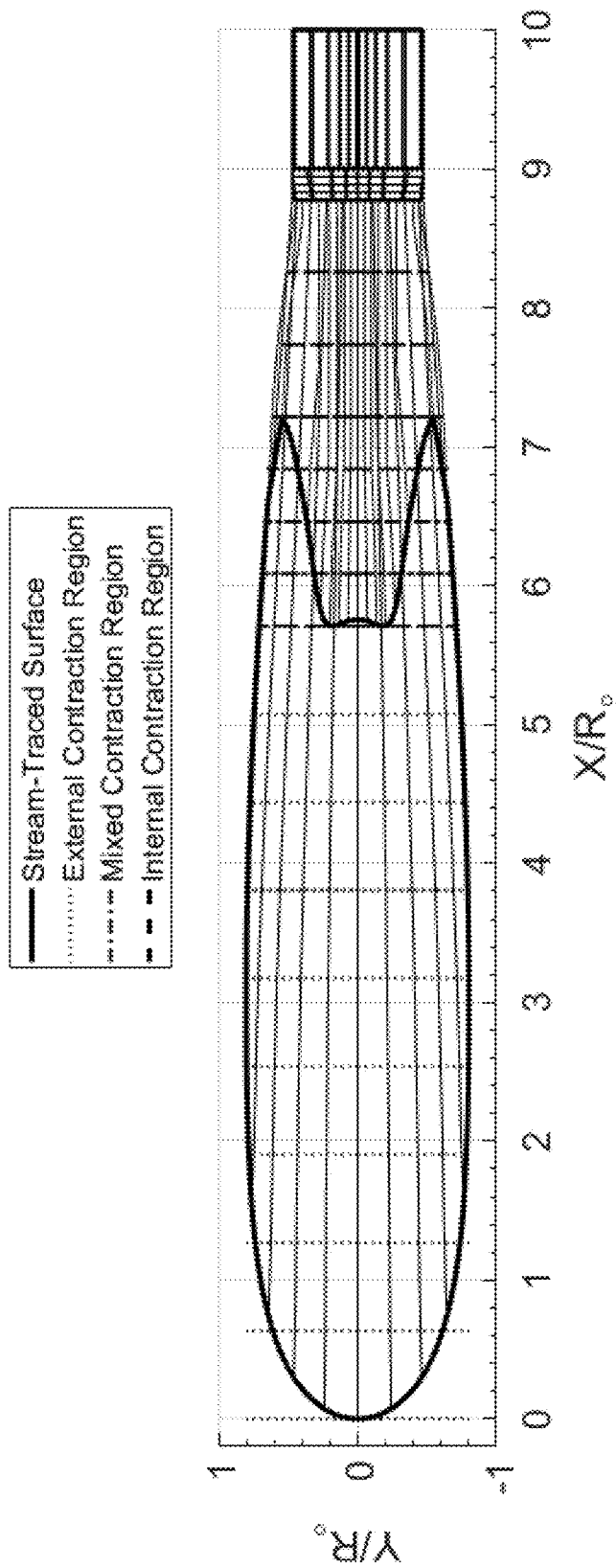

The intended purpose of the following detailed description of the invention and the phraseology and terminology employed therein is to describe what is shown in the drawings, which include the depiction of and/or relate to one or more nonlimiting embodiments of the invention, and to describe certain but not all aspects of what is depicted in the drawings, including the embodiment(s) to which the drawings relate. The following detailed description also describes certain investigations relating to the embodiment(s), and identifies certain but not all alternatives of the embodiment(s). As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

The following describes a stream-tracing method for the development of high-speed inlets. Inlets derivable with this method include shape-transitioning and inward-turning, and are preferably characterized by being mixed contraction and self-startable. A capture shape and an isolator shape are discretized from a user-defined origin point. Rays that intersect the capture and isolator shapes are then projected forward to create an osculating plane (OP). The theory of osculating axisymmetric is applied, which states that all flow within each osculating plane is locally two-dimensional and irrotational. These osculating planes are defined over an azimuthal sweep of the inlet and contain the streamline solutions from the stream-tracing program.

The upper compression surface is stream-traced from a unique two-dimensional parent flowfield. The parent flowfield is a combination of two inviscid contours solved from the Taylor-Maccoll equations: the Busemann Diffuser and internal conical flow A (ICFA) solutions. The merging of these streamlines creates an inward-turning and highly efficient parent flowfield with a straight leading-edge shockwave. This contour, corresponding to abase flowfield (internal conical flow C, or ICFC), is then iterated to fit within strict geometric radial limits defined by a given shape transition. A third optimization loop varies the free variable called the centerbody. Modifications to the centerbody height cause the throat shock strength to change. This allows for a tuning of the post-shock Mach number in the isolator for each 2D flowfield. Iteration of these three processes repeats until a defined tolerance limit is met for the streamline loop, geometric loop, and post-shock Mach number loop.

The lower shock-capture surface duplicates the streamline from the upper compression surface for that specific osculating plane. This streamline is then shrunk to fit within the theoretical shock intersection point of the ICFC flowfield. This allows the inlet to operate in an on-design mode for a given freestream Mach number with a shock-on-lip condition. This condition allows for minimal flow spillage, which is important for downstream requirements in an air-breathing engine. The lower shock-capture surface contours close the geometry and turn the flow parallel into the isolator. The combined upper and lower shock-capture surface is completed for all osculating planes. These solutions are then stitched together to form a three-dimensional inlet shape. A nonlimiting embodiment of such an inlet shape is depicted in FIGS. 1A through 1D.

Nonlimiting embodiments of the invention will now be described in reference to experimental investigations leading up to the invention.

Stream-Tracing Outline

Methods and systems relating to this invention encompass an inlet design tool that applies the osculating axisymmetric (OA) assumption to characterize, define, and create high speed, inward-turning, and shape-transitioning inlets. The method was compelled by a desire to produce open-source inlet geometries that could satisfy academic inquiry into relevant inlet aerodynamic phenomena. This disclosure discusses in part a design code for achieving such a capability.

The method may utilize MATLAB® and combine several scripts that complete different steps in the stream-tracing process. Three of these scripts may be parallelized for faster run-times on multi-core processors, computer clusters, or high-performance supercomputing resources. The stream-tracing code utilizes the signal processing, symbolic math, parallel computing, and instrument control toolboxes of MATLAB®. The stream-tracing code can be solved serially and solution smoothing steps can be accomplished manually, however in preferred embodiments the code functionalizes and automates these steps.

The main script calls a file that contains user-defined inputs into the program. The program then sets the parallel-pool based on the number of free logical processors on the system. This activates the maximum amount of CPUs on the available system for the program. After this step, the program continues into the main scripts that create the inlet. The accompanying scripts can be run independently if troubleshooting or tweaking is required.

Shape Transition Definition Script

The shape transition function specifies the hypothetical frontal inlet shape and the isolator exit shape. These shapes can be solved from super-ellipse equations that were historically used to create the NASA rectangular-to-elliptical shape-transition (REST) inlets. The user can specify a certain shape by changing the super-ellipse exponent value and then stretch or contract that shape through a defined aspect ratio. Many shapes, such as squares, circles, diamonds, or stars, can be defined. Besides defining the inlet and exit shapes, this script also iterates on the centerbody radius to match a design contraction ratio (CR). The iteration of this value is not parallelizable and it may not converge, and therefore should be verified that this parameter converges correctly. Because the CR value is an estimate, this input variable should be over-estimated as final CR values may be 10-30% lower than the given input. The script also discretizes the shape along an azimuthal sweep emanating from the origin. The intersection points of the ray along the sweep determine the radial limits of integration for the stream-tracing routine. This process is parallelized for faster run-times. If errors occur within this routine, it is most likely occurring from unsolvable radial limits that were defined from this function.

Stream-Tracing Routine Script

The stream-tracing routine script creates the aforementioned inviscid contours derived from the Taylor-Maccoll equations that constitute the sugar-scoop geometry of the inlet. The process iterates through several million possible solutions of the differential equations to find a solution set that satisfies all constraints. It has been observed that many different solutions exist to the same constraint on a single osculating plane (OP). Thus, more than one inlet may exist for a particular shape transition or given input. In investigations leading to the invention, this routine was parallelized in the outer-most 1-loop by allowing individual OP solutions to be solved independently.

Stream-Tracing Routine

The method applies a unique approach to OA theory. Unique Busemann solutions are solved in each osculating plane and merged with a leading ICFA contour. The ICFA contour creates a straight leading-edge shockwave of known strength. It is solved from the Taylor-Maccoll equations by changing the boundary conditions. The ICFA contour is merged with the Busemann contour at a point that matches the expansion Mach number of the flow as it turns at the merging point. This is accomplished by iterating on throat shock angle within the code's inner-most i-loop. Once the streamline is merged, the total radial width of the streamline is compared with the limits defined by the shape transition. If the streamline is too tall or too short, the pre-shock Mach number at the throat is iterated. The j-loop completes the radial convergence iteration. This coupled process is repeated until a solution is found that satisfies both the streamline and geometric convergence limits.

To satisfy OA theory, the ICFA contours are the same in each OP to reduce the effects of azimuthal pressure gradients. However, if OA theory is willfully broken, the azimuthal shock strength can be tailored as a function of the azimuthal angle. The effects of this change on inlet operability remain a free variable in the code. To reduce complexity, the ICFA deflection angle can be made constant for all OPs.

The optimization loop focuses on the post-shock Mach number at the throat for individual OPs. A third variable, called the centerbody parameter, can be added as a radial offset to the entire Busemann contour. Since the leading-edge shockwave angle is fixed, the throat shock angle is forced to change. This, in turn, changes the shock intersection point of the leading edge and throat shockwaves. The centerbody acts as a fictitious wall from which the leading edge and throat shocks are focused. Modifying this free variable allows the user to control the Mach number past the throat shock, which is done in the k-loop. This can potentially reduce inlet distortion or improve the chances of hitting a targeted isolator inflow condition. The optimization parameter can be changed for each OP, and can be made a function of azimuthal angle to give the user more freedom to create new inlet shapes.

Solution Smoothing Script

The solutions derived from the stream-tracing routine function will not always converge. For numerical and/or geometric reasons, certain OPs may fail to reach a solution or will find a solution that exceeds the tolerance bounds. A check of the residuals against the defined tolerance is preferably automatically performed in this script. Since there are three loops (streamline, geometric, and optimization), there are three independent solutions for each OP: pre-shock throat Mach number, throat oblique shock angle, and centerbody radius. These values are filtered by removing OPs that failed to converge or OPs that converged to a value that is too far from a neighboring value. Many non-unique solutions exist for an OP, and forcing neighbors to act similarly improves run time performance and reduces perturbations in the generated geometry. As such, gaps in the solutions are interpolated and smoothed by a moving polynomial filter. This process can be automatic and repeated several times to remove extraneous outliers. The filtered solutions can then be saved and fed back into the stream-tracing routine.

A separate loop contains the stream-tracing routine and the solution smoothing scripts. This loop re-runs the stream-tracing routine with updated, smoothed solutions. The automatic re-running of the program can remove perturbations in the geometry and provides better and closer guesses to potential solutions. The loop terminates early if all OPs successfully converge. The residuals for each OP during each iteration are recorded for convergence studies.

Lower Surface Definition Script

The shock capture surface closes the geometry by bringing the hypothetical extension of the cowl forward. It captures the conical shock structure generated by the leading-edge geometry through a parallel streamlines technique. The lower surface simply scales-down the upper compressive surface streamline until it fits within the shock structure of the leading edge and throat shocks. This only occurs if the shock intersection point is below the lower portion of the isolator shape. If the shock intersection point is above this lower portion, then there is no way to fit in a parallel streamline. For this case, the lower surface is extended forward to meet the hypothetical intersection point of the leading-edge shockwave with the isolator. This process generates a "tongue" like structure that protrudes forward from the isolator, which usually generates a double cowl-lip geometry. However, there are cases where the tongue disappears and a single cowl cut-back is observed. This method is just one way at capturing the leading-edge shockwave, and it can be substituted with a potential method-of-characteristic solver that more adequately cancels the reflected shock generated by the tongue. Also, the method can be inverted into a "Double Busemann" configuration or by just extending the isolator forward to capture the incident shocks. The Lower Surface Definition script can also be parallelized to improve compute times.

Performance Metrics Script

This script in the main routine consolidates relevant information and plots the inlet geometry. Exact values for the contraction ratio and internal contraction ratio are found by taking streamwise slices of the inlet streamtube. The area constriction profile and total height/length variables are also saved. Plotting functions and video playback functions also exist to allow for three-dimensional visualization. Hypothetical on-design inlet performance parameters are calculated by taking area-weighted averages of flow quantities between OPs. Using the ideal compression performance of each streamline and its shock angle, the total pressure loss, compression ratio, cowl Mach number, and throat Mach number can be calculated. These values are saved to a "Compare" struct for future evaluation.

Compare Performance Script

This script compares multiple inlets visually and analytically. A simple ui-retrieve file can be used to allow the user to import the saved workspace files of multiple generated inlets. From these files, the inlets can be shown side-by-side or overlaid on each other. The latest functionality allows the user to compare Gortler Number between inlet designs.

Absent Functionality

Parallelized versions of the inlet design tool do not require certain functions that exist within serial versions of the tool. However, if the total workspace is saved, then these values can be brought into the serial version and run with these functions successfully. The serial version contains plotting functions that can calculate Mach, static pressure, or static temperature along the upper inlet surface, in azimuthal slices, or in axial slices to provide a flowfield visualization feature. The serial version also contains a turbulent and compressible boundary-layer solver for flows with arbitrary pressure gradients. This functionality allows the user to find the hypothetical displacement thickness along each streamline and adjust the geometry for the boundary layer growth. From this solver, the Gortler Number can be calculated when combined with the known radial curvature of the inlet. This may allow the user to predict the location vortical structures or Gortler boundary layer transition. If a certain throat geometry is necessary, a throat transition region can be specified to transition the corrected boundary-layer throat with a known throat geometry. Other functions include a simple outer mold-line tool and a geometric i-j-k and csv data export function.

Further capabilities envisioned for the inlet design tool include surface heat transfer estimates, off-design performance solvers, and a batch-program workflow to run thousands of iterations on different inlet designs. This would accompany a Pareto-front optimization routine that could optimize for specific user criteria. The limits and breakdown of OA theory may also provide insight into the design of enhanced inward-turning compression systems. Other inlet construction techniques are also foreseeable, such as the "Double Busemann—Jaws 2" design.

Code Inputs

The code can either operate with inputs read-in automatically from a spreadsheet file or from statically defined variables in the program. Spreadsheet read-in functions can be built for batch running on a high performance computing (HPC) system. Inputs can be classified as part of different groups: geometric, flow condition, tolerance, or discretization. Geometric inputs listed in Table 1 allow the user to define the appropriate shape transition of the inlet and the leading edge deflection angle of all ICFA contours.

Flow condition variables are parameters that allow the user to define a freestream Mach number, the ratio of specific heats, and the targeted Mach number at the throat for all osculating plane solutions. These variables are listed in Table 2.

Tolerance limits of each iteration loop in the stream-tracing routine script are defined in the third variable group presented in Table 3. Loose tolerances may be used on initial iterations and then tightened on consecutive runs through the code. It is also recommended to make "outer-loop" tolerances less tight than the tolerances defined on the "inner-loops" (make the i-loop tighter than the k-loop, for instance). Also, the smoothing variable determines how many potential smoothing loops are given in the code.

Discretization parameters are shown in Table 4. The batch number and total amount of osculating planes are defined. Other variables, such as the ODE step-size and contour lengths, preferably should not be drastically changed. Instead, if output geometries require less output points, a downsampling and endpoint-preserving function is preferably used to export geometries for computer-aided design (CAD) or CFD mesh generation.

High Level Block Diagram for Inlet Generator

Figure 2:
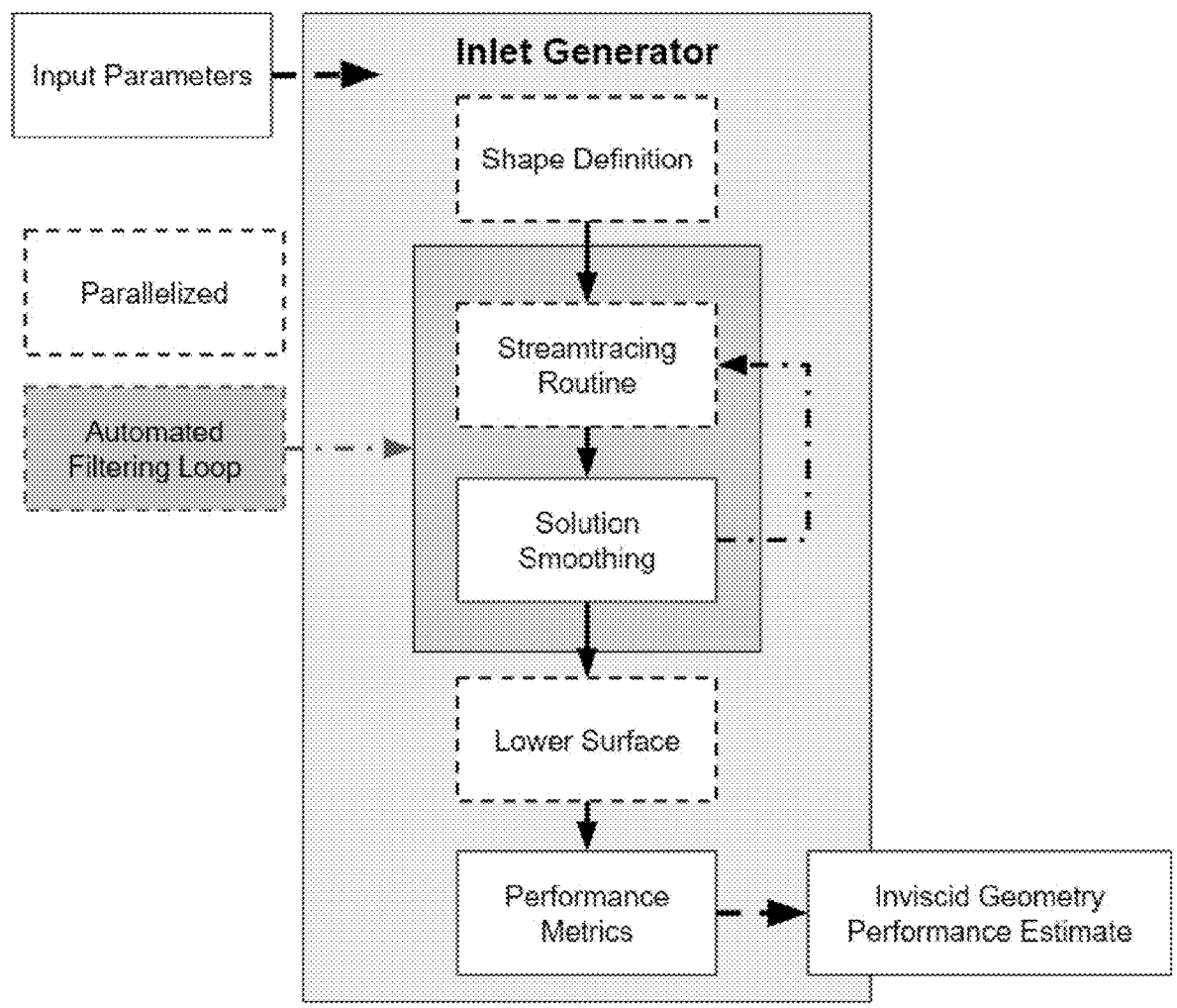
FIG. 2 is a high-level block diagram representing an inlet generator code summarized as a series of functions.

An inlet generator code can be summarized as a series of functions in a high-level block diagram, as represented in FIG. 2. Given inputs are injected into the program as global variables and visible to all scripts. As noted above, certain scripts were parallelized for faster run times, and those are outlined in dashed-blue lines. Additionally, an automated smoothing function takes outputs from the stream-tracing code and feeds them back into the program to ensure convergence of all OPs. At the end of the code block, the Performance Metric script plots the generated inlet for visualization. Certain performance of parameters of interest are saved to the Compare struct variable. Also, the workspace can be saved as a back-up to the "Total_Workspace_#.mat" file. These can be loaded into other scripts or the serial version of the program for more post-processing and analysis.

Figure 3:
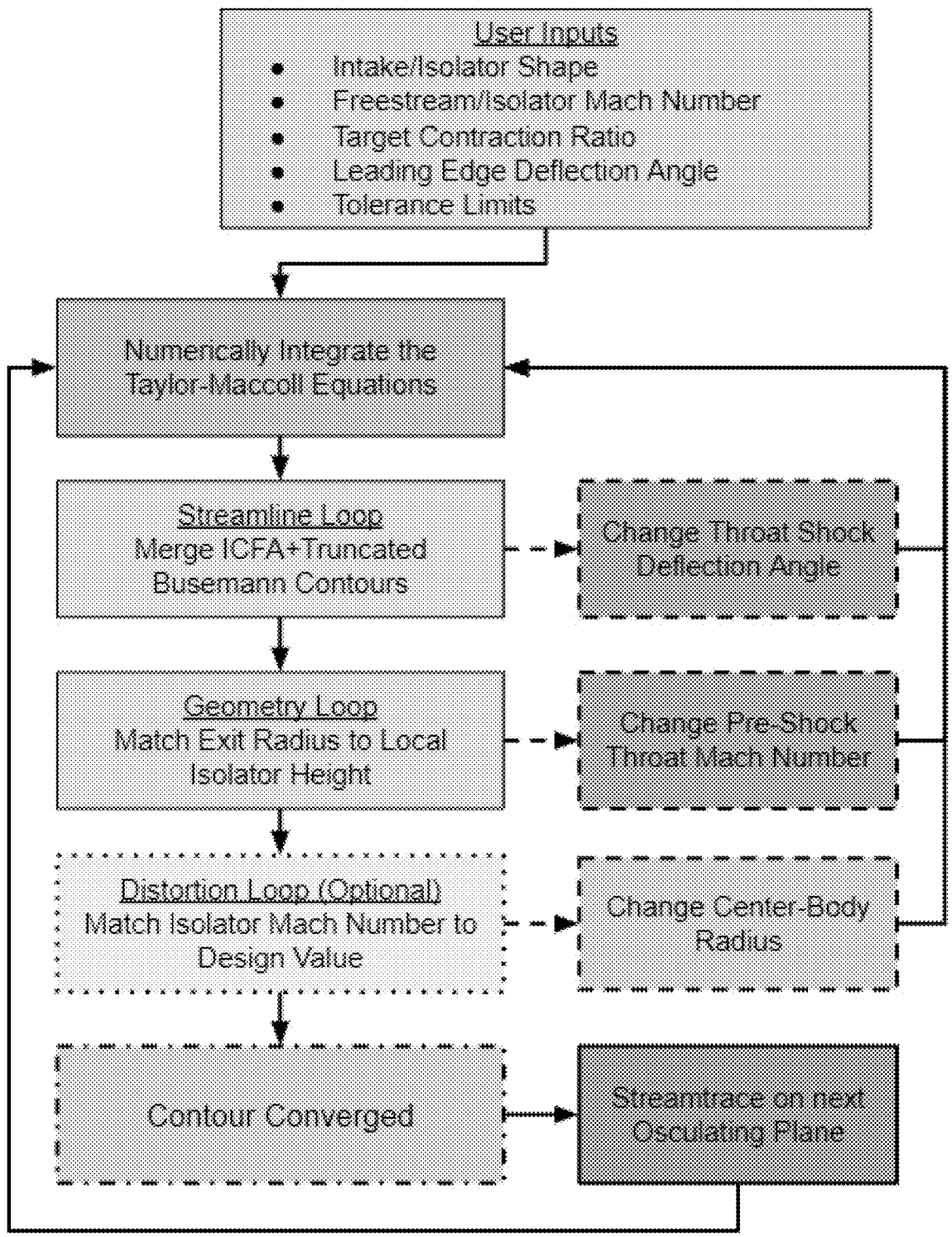
FIG. 3 is a block diagram representing a stream-tracing routine script.

The stream-tracing routine script requires a code-block diagram for itself, such as represented FIG. 3. A given set of inputs from the user and the shape definition script provide the bounds of integration for the Taylor-Maccoll ordinary differential equation solver. A fixed-step Runge Kutta method is called through the ODE-45 function for each iteration. Three free variables may be iterated within a triple-iteration loop for each osculating plane. A secant-based solver may be implemented in each loop to hasten convergence times. The outer-most l-loop, which sweeps through different OPs, can also be parallelized to speed convergence.

Figure 4:
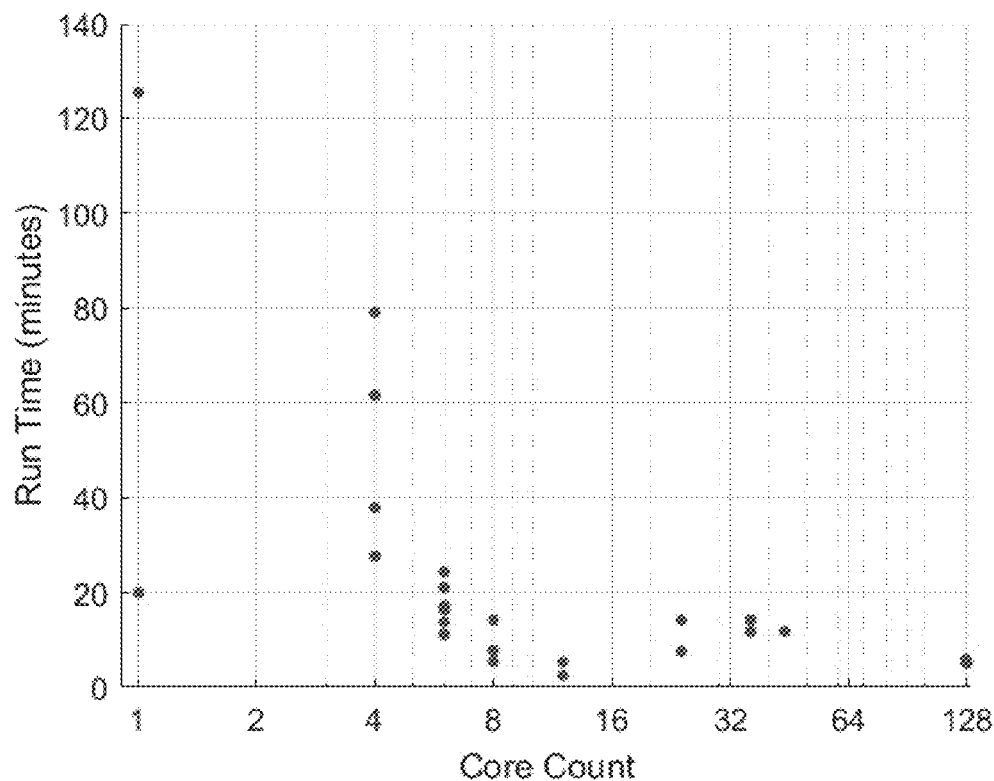
FIGS. 4 and 5 are graphs representing run times for first and second iteration passes of a stream-tracing routine script.

In investigations leading to the invention, several different systems were used to run the inlet generator program and its parallelized scripts. Each system had a different processor, different amount of RAM, and different processor clock speeds. The single-core, quad-core, and hexa-core processors were personal computers. Any data point that used a core count of twelve or more was run on either an AFRL Portal node, HPC Mustang, or HPC Narwhal. The slowest part of the program was the stream-tracing routine, which contains the triple-iteration loop that converges for all OPs. This particular script was tracked to determine the benefits of parallelization. FIG. 4 shows run times of this script for a first-iteration pass. A clear trend emerged when the number of logical processors increased. A drastic 27× speed-up was seen for the best-case scenarios.

Figure 5:
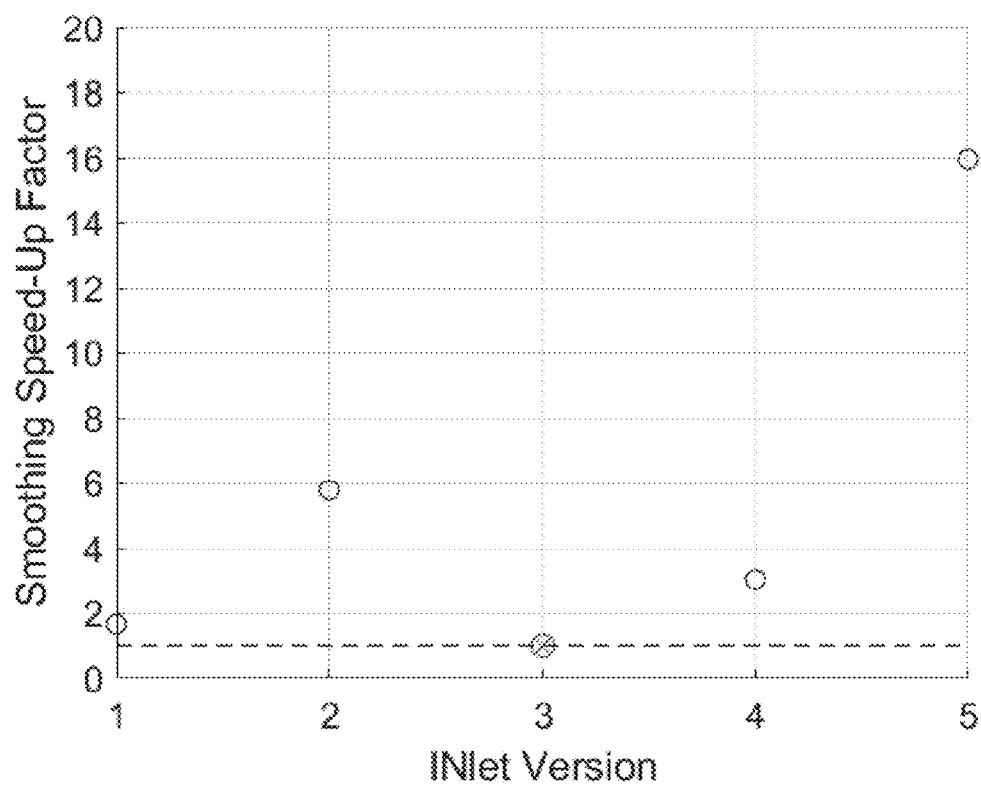
Figure 6:
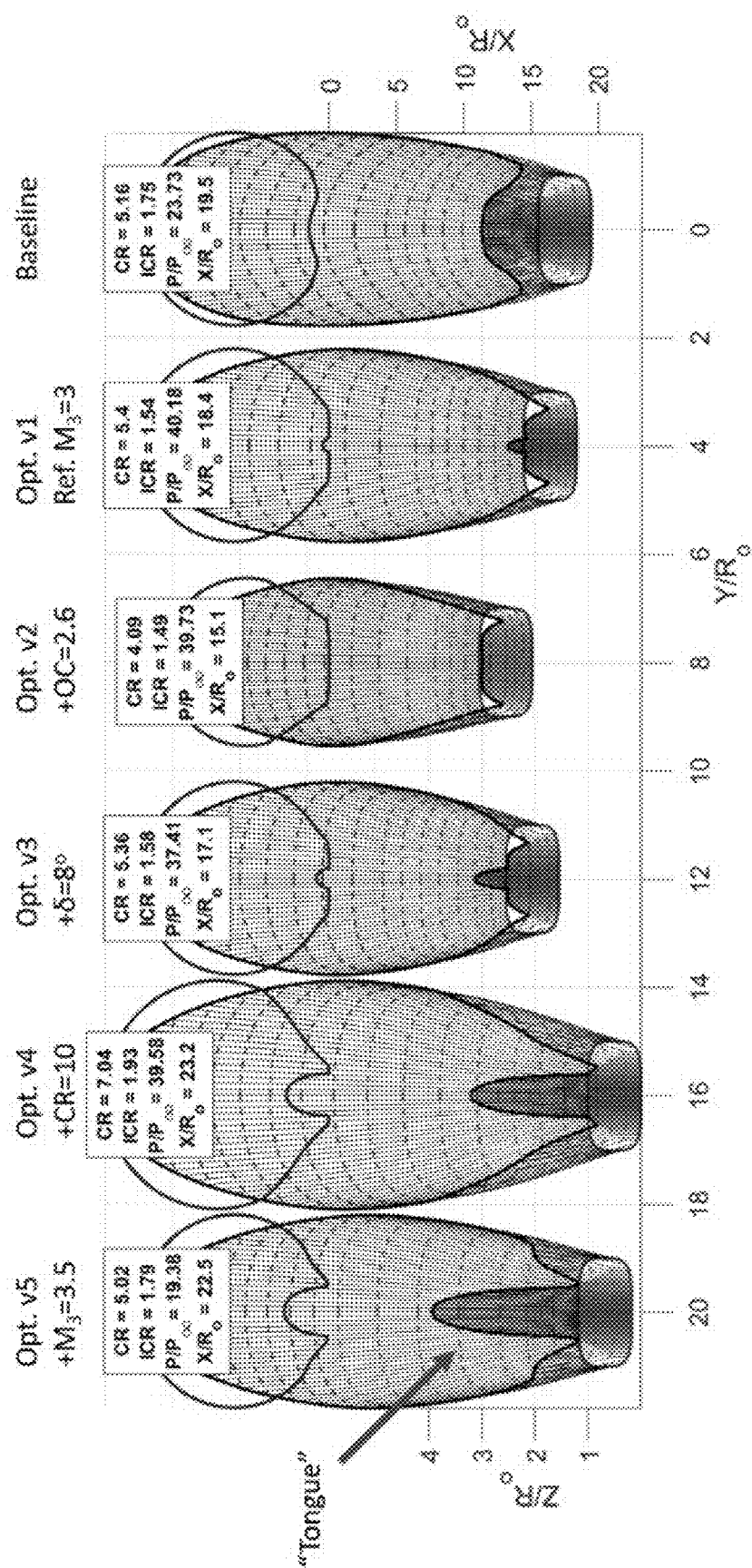
FIG. 6 schematically represents a family of inlets generated from a baseline inlet.
Figure 7:
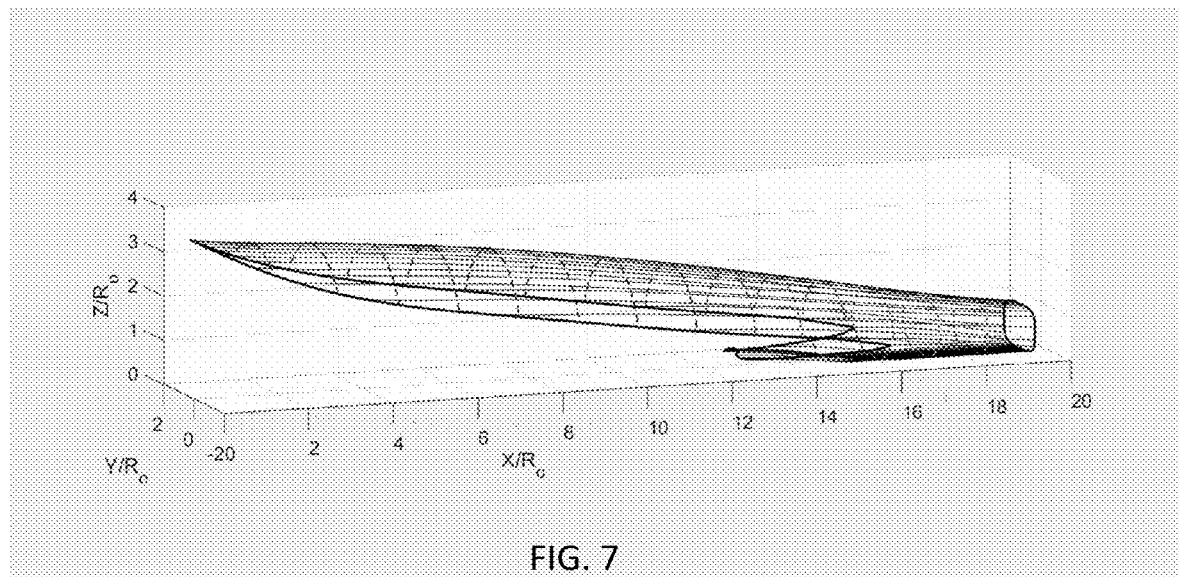
FIG. 7 contains a three-dimensional graphical representation of a baseline inlet of the family of inlets of FIG. 6.
Figure 8:
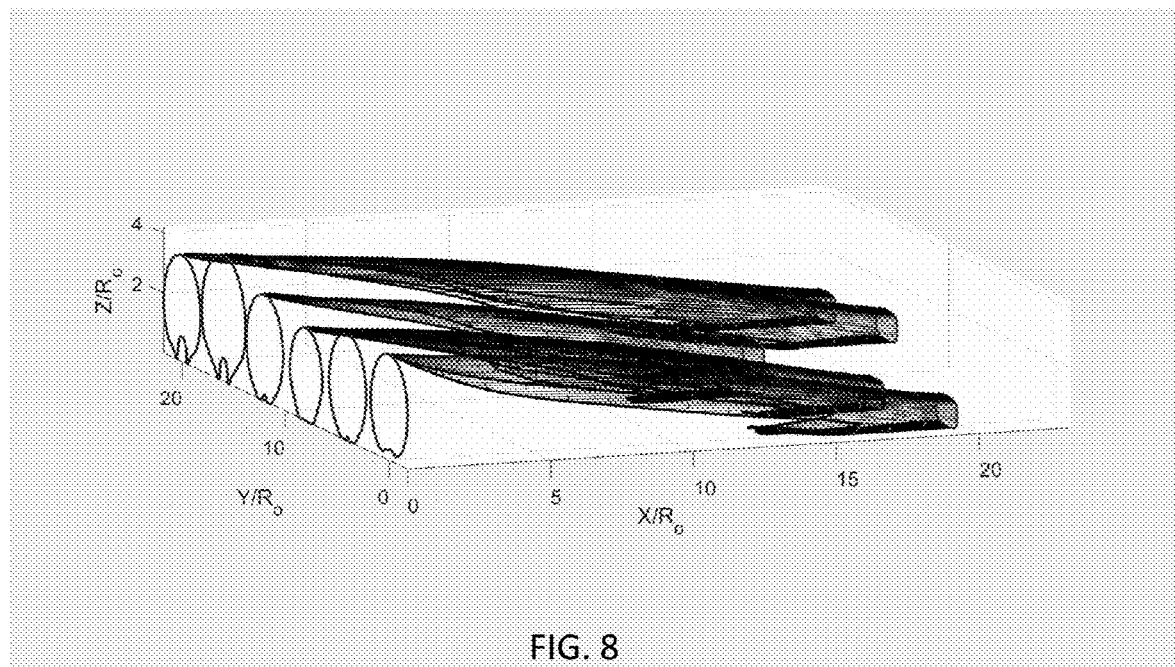
FIG. 8 contains three-dimensional graphical representations of the family of inlets of FIG. 6.

The first-iteration passes were the most computationally expensive. However, successive iterations have past guesses that promote convergence rates. This also decreases computational cost depending on the specific geometry. FIG. 5 represents increased speeds observed in a second iteration of the stream-tracing regime for a family of inlets represented in FIGS. 6, 7, and 8. This family was a class of circular to rectangular shape-transitioning, high-speed inlets designed for a Mach 6 freestream flow at 0° angle-of-attack. A baseline inlet, represented in an isolated view in FIG. 7 and designed with the stream-tracing code, was not optimized for a specific isolator Mach number. The optimization loop was intentionally left deactivated. Using the same defined shape transition, a variety of input parameters were modified to study changes in the generated geometry and theoretical inviscid performance. Additional inlets were also optimized to a set isolator Mach number in all osculating planes. FIGS. 6 and 8 represent five additional inlets that were generated by changing offset circle size (input: static centerbody radius), leading deflection angle, target contraction ratio, and isolator Mach number. Table 5 shows a list of modified variables for each additional inlet and how they affect the geometry or performance.

FIG. 6 provides a visual comparison of the baseline and additional inlets generated by the method described above. Four of the additional inlets contain a lower-surface "tongue" that extends forward. The presence of the tongues was not a numerical anomaly. The shockwave generated by the leading surface must be captured by bringing the cowl enclosure forward. When this occurs, the shock is completely captured by such tongues, which provide an "on-lip" condition with no spillage.

It should be noted that the tongues are not necessary or present in every inlet represented in FIG. 6. Since the tongue itself is a manifestation of the leading edge shock structure, it could be changed by altering the geometric inputs, such as offset circle radius or leading edge deflection angle along the ICFA contours. Also, since individual solutions to each osculating plane are not unique, it may be possible to force this parameter to converge to a design within the filtering/smoothing script. This allows the user to define a centerbody function that creates a favorable shock structure, especially at low osculating plane angles where the tongue first develops.

Additional aspects and advantages of methods disclosed above will be further appreciated from nonlimiting embodiments, investigations, etc., described hereinafter.

In one example of a high-speed air intake developed according to principles of the present invention, a high-speed intake (also called variously "the Indiana Intake Testbed," the "Inlet Testbed" and the "Indiana-Intake") was developed for experimentation within the Boeing-AFOSR Mach 6 Quiet Tunnel at Purdue University. This inward-turning, mixed compression air intake was developed from osculating axisymmetric theory and uses a streamtracing routine according to aspects of the present invention to create a shape-transitioned geometry. The design was developed using a computer implemented software design tool including software code implemented on a computer processing system with appurtenant digital computer hardware and software as readily understood in the art in accordance with various aspects of the present invention.

A streamtracing intake design code was developed in MATLAB® generally in accordance with the principles already described above and as further described below to construct the Indiana Intake Testbed. The design tool constructs inward-turning air intakes with the Osculating Axisymmetric technique, which is a modified Osculating Cone method for creating arbitrary shape-transitioned waveriders. The intake design code uses these principles to construct three-dimensional, shape-transitioning, mixed compression, and inward-turning hypersonic intakes. The design tool combines several iterative functions that work in tandem to create the inner mold line (IML) of the intake's surface. Streamlines are traced through an outer capture shape and an inner throat geometry. Each streamline is a unique conical flowfield generated by the Taylor-Maccoll equations. The heart of the design code is the streamtracing routine. However, it also contains analytical performance tools and export tools for geometry and mesh generation in CAD and CFD programs.

Defining the Shape Transition

The creation of a shape-transitioning inlet requires the definition of a capture shape and a throat shape. For realistic designs, the capture shape is commonly molded into the vehicle's fuselage in a rectangular fashion. The intake's throat shape is then defined as a circle or ellipse. Overall, the most common shapes for intakes include circles, ovals, squares, and rectangles. The maximal length (l) and height (h) for both the throat shape and capture shape can be specified separately. It is common to define an aspect ratio (AR) from equation (1) and substitute that in as a design parameter. The parametric superellipse family, described by equations (2) and (3), provide a quick and robust way to analytically define several of these key shapes with a few input parameters. The super-ellipse exponent (n) defines the desired shape. Historically, these equations have been used to create the REST intake family.

$$AR = \frac{l}{h} \qquad \text{Eq (1)}$$

$$x(t) = |\cos t|^{\frac{2}{n}} \cdot h \cdot AR \cdot \text{sign}(\cos(t)) \qquad \text{Eq. (2)}$$

$$y(t) = |\sin(t)|^{\frac{2}{n}} \cdot h \cdot \text{sign}(\sin(t)) \qquad \text{Eq. (3)}$$

Figure 10:
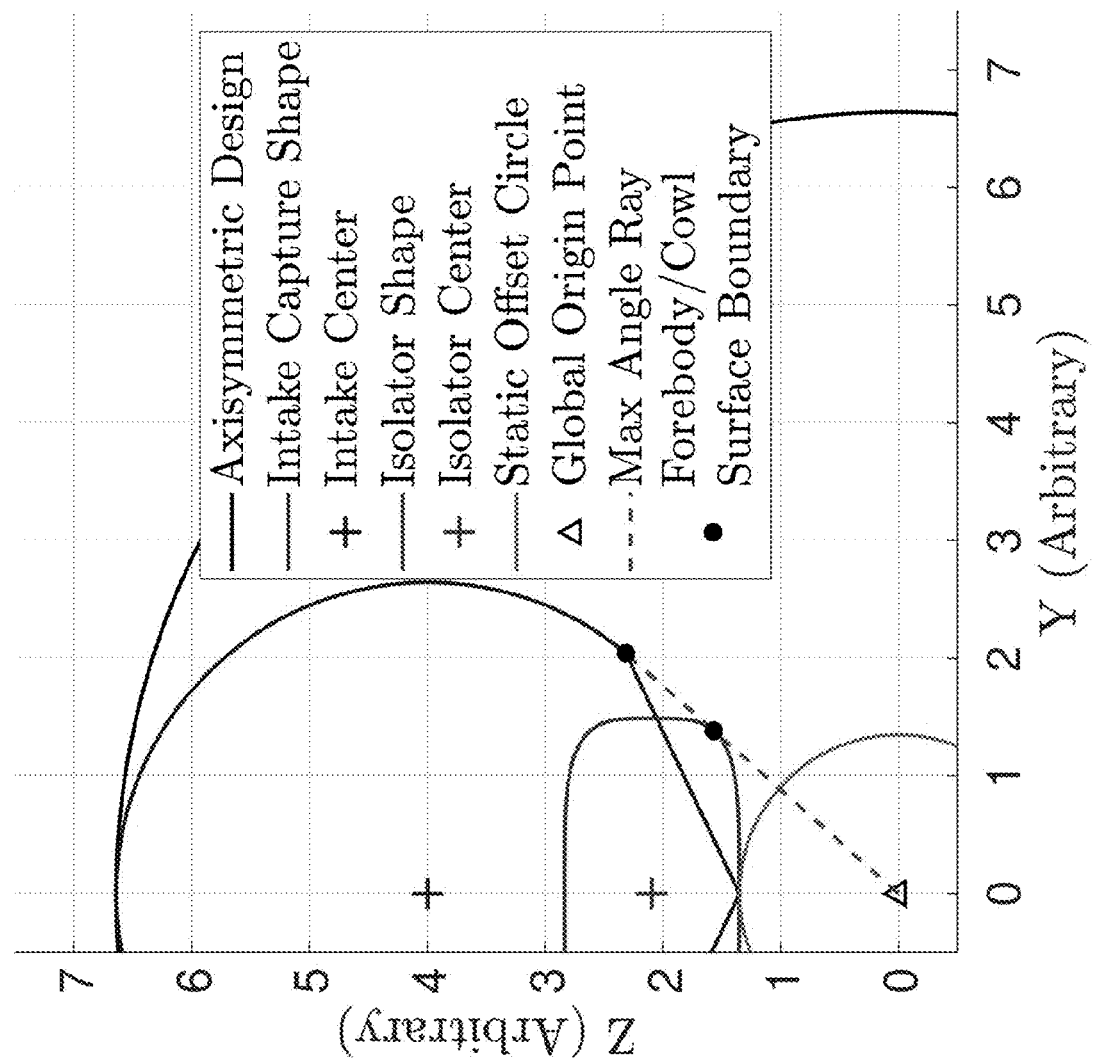
FIG. 10 illustrates a shape-transition profile defined for a high-speed intake.

A circular capture shape (AR=1, n=2) and a planar (rectangular) isolator with constant corner radii (AR=2, n=4) was defined using these equations. This shape-transition was chosen for the Inlet and is presented in FIG. 10.

Defining the Osculating Planes

Figure 11:
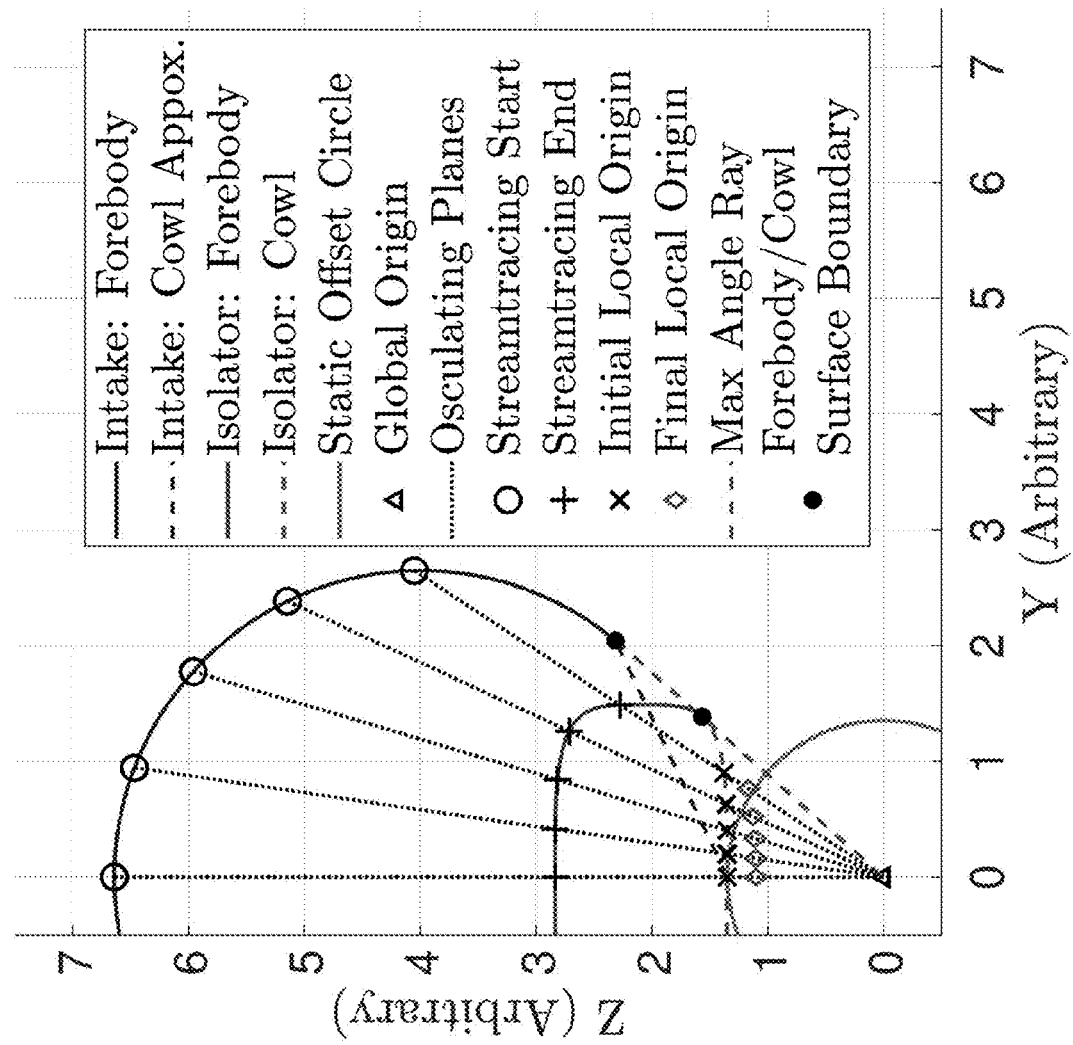
FIG. 11 illustrates osculating planes defined on the high-speed intake from a 2D base view.

Before the streamtracing process can begin, it is prudent to define the osculating planes at all inlet azimuthal positions. Sobieczky et al., "Hypersonic Waverider Design from Given Shock Waves," Proc. First International Waverider Symposium, University of Maryland, 1990, pp. 1-20, proved that axisymmetric flowfield solutions, such as Taylor-Maccoll, can be used in each osculating plane to construct a full three-dimensional flowfield. Thus, each consecutive osculating plane contains the solution of a Taylor-Maccoll equation with different boundary conditions. Each inviscid contour is traced through the inner and outer radial bounds defined by the intake and isolator shape. As the angle of the osculating plane changes, so does the radial boundary conditions defined by the capture and throat shapes, as illustrated in FIG. 11. In this example, several dozen osculating planes are defined to discretize the full inlet calculation. These lines act as two-dimensional projections of the osculating planes. Likewise, all osculating planes for the inlet share this local origin axis.

Defining the Parent Flowfield

Designing a compressive internal flowfield for a hypersonic inlet relies upon the definition of a parent flowfield that compresses the flow efficiently. Historically, designers have used reversed nozzle flowfields or method-of-characteristic solutions to create an inlet. The Taylor-Maccoll equations, which describe supersonic conical flow, can be integrated to produce internally convergent flowfields that satisfy this requirement. This set of ordinary differential equations are presented in equations (4) and (5). The streamline equation is defined in equation (6). These equations are solved numerically using a MATLAB® fixed-step Runge-Kutta 4 solver in the streamtracing routine.

$$\frac{du}{d\theta} = v + \frac{\gamma-1}{2}uv\frac{u+v\cot\theta}{v^2-1} \qquad \text{Eq. (4)}$$

$$\frac{dv}{d\theta} = -u + \left(1 + \frac{\gamma-1}{2}v^2\right)\frac{u+v\cot\theta}{v^2-1} \qquad \text{Eq. (5)}$$

$$\frac{dr}{d\theta} = \frac{ru}{v} \qquad \text{Eq. (6)}$$

Figure 12:
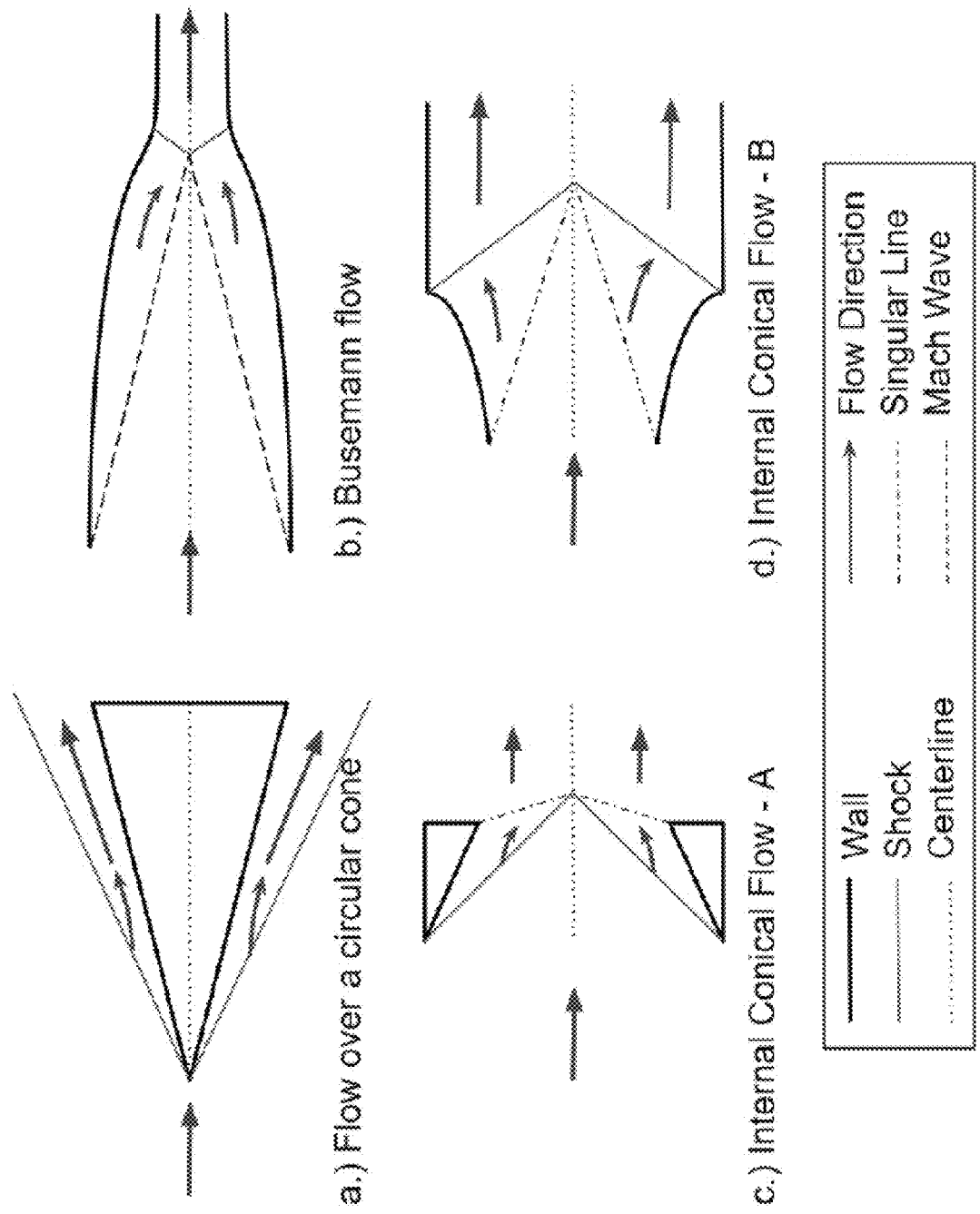
FIG. 12 illustrates visualization of four solutions to the Taylor-Maccoll equations (adapted from Molder, and reprinted by permission of the American Institute of Aeronautics and Astronautics, Inc.).

Depending on the integration limits, the Taylor-Maccoll equations can produce four different solutions. A visual of each contour is shown in FIG. 12. The Busemann solution and Internal Conical Flow-A (ICFA) solution are internally converging and compressive.

Busemann Contour Definition

The classic Busemann solution to the Taylor-Maccoll equation provides the necessary internally convergent and compressive parent streamline needed to design a high performing inward-turning inlet. In this design code, a shock wave angle is specified as the initial parameter for the integration. Other design codes may use postshock Mach numbers, total pressure recovery values, or static pressure targets as an input and back-solve the necessary shock wave angle for that condition. Then, the contour is traced upstream until a freestream condition is met. Sometimes the solved freestream Mach number does not match the design condition and iteration is necessary. The inviscid streamline from any of these solutions becomes the contoured "wall" of the inlet.

ICFA Contour Definition

The theory of Osculating Cones, which forms the basis of Osculating Axisymmetric Theory, states that incoming flow must be processed by shocks of equal strength in each osculating plane. This requirement prohibits the use of truncated Busemann contours due to their propensity to create curved shocks. Interestingly, the Internal Conical Flow-A solution provides a resolution to this problem. The ICFA contour is internally convergent, similarly to the Busemann solution, but it solves an axisymmetric conical flowfield behind a straight, leading-edge conical shock. The generated ICFA contour is short and provides negligible isentropic compression, so it cannot be used as the parent flowfield. However, it can be stitched to an existing parent contour, such as the truncated Busemann. Merged contours of the truncated Busemann and ICFA contour are eloquently called the Internal Conical Flow-C (ICFC) solution in the literature. ICFC extensions were found to improve shock placement, increase adiabatic efficiency, and reduce total pressure loss. They have also been shown to significantly reduce wetted area, length, and mass spillage. The associated benefits to this truncation technique are well documented. It is no surprise that it is now being used in the design of waverider intake.

ICFC Merging Procedure

Figure 13:
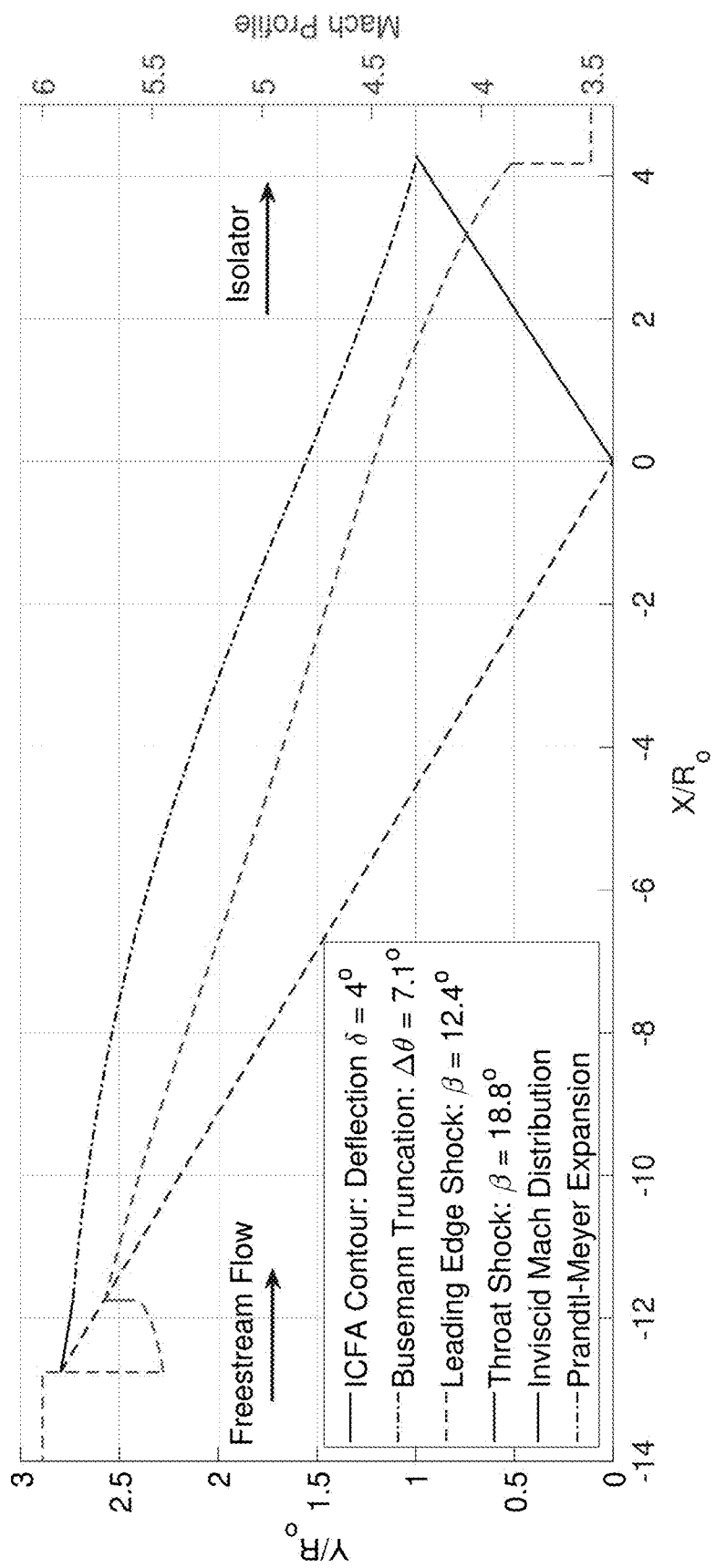
FIG. 13 illustrates generic ICFC contours for a Mach 6 freestream condition.

The combination of a Busemann streamline and an ICFA contour satisfies Osculating Axisymmetric Theory's requirements for a local 2D conical flowfield with a leading-edge shock that is of equal strength in each osculating plane. Additionally, the ICFC contour reduces distortion along the inviscid flowfield's centerline. Improvements to the flowfield are heavily determined by the merging procedure. The ICFC merging process is outlined as follows:

1. Define a leading edge deflection angle and freestream Mach number. The ICFA contour is defined from these quantities through the oblique shock relations.
2. Integrate the Taylor-Maccoll equations starting from the leading oblique shock in the downstream direction. Integration is halted automatically when the numerical solver encounters a singularity. The singularity occurs at the singular ray, which will be the merging point that connects the truncated Busemann contour to the ICFA contour.
3. Find and record the total Mach value at the end of the ICFA contour.
4. Guess a throat shock angle that obeys the weak-shock criterion.
5. Integrate the Taylor-Maccoll equations upstream from throat oblique shock to the recorded singular ray. This will truncate the Busemann contour. Record the Mach number of the Busemann contour at the singular ray.
6. Calculate the geometric deflection between ICFA and Busemann contours.
7. From the deflection angle, find the Prandtl-Meyer expansion angle.
8. Calculate the Mach number of flow exiting the ICFA contour as it moves through the expansion fan.
9. Compare the Mach number after the expansion with the Mach number at the leading edge of the truncated Busemann streamline. If the Mach numbers are sufficiently close, then the contour has converged.
10. If the Mach numbers do not match, iterate the process by changing throat shock angle with a secant-based numerical scheme. The process repeats until the Mach numbers converge. A fully converged profile is shown in FIG. 13.

The ICFC creation loop is the inner-most loop in the MATLAB® streamtracing tool. It iterates on isolator Mach number frequently, so a secant-based numerical method is used to speed convergence.

Geometric Streamline Merging Procedure

Fitting the ICFC contours into the geometric boundaries of each osculating plane requires a new iteration process. After the parent ICFC flowfield is initially created, the contour is shifted up or down. The last point of the contour is matched to a location at the throat. The leading-edge radius is then compared to the capture shape for that osculating plane. It is common that the leading-edge radial height does not match the target. For these cases, the throat oblique-shock angle is iterated and the ICFC merging process is repeated.

Figure 14:
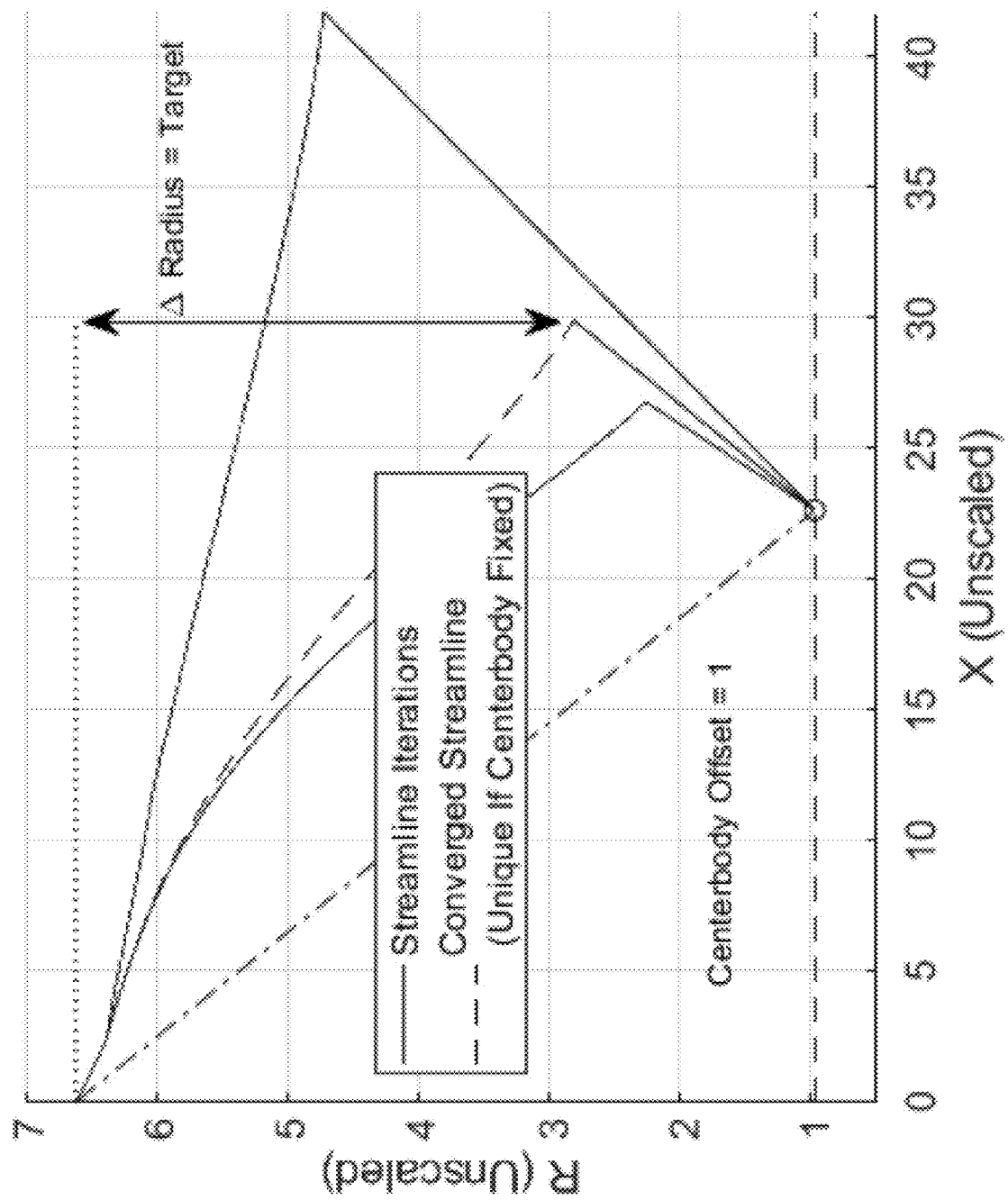
FIG. 14 illustrates a geometrically converged ICFC parent flowfield for a local osculating plane.

The throat Mach number and throat oblique-shock angle become independent variables that tune the local ICFC contour to fit the defined shape. Note that the contour is not scaled, as is commonly done in other streamtracing routines. Scaling the contour to fit within the radial bounds is possible, but it changes the intersection location of the leading and throat shocks for all osculating planes. Keeping the intersection point consistent for all solutions is helpful to create the lower surface geometry. The Busemann portion of the contour is continuously iterated (not scaled) until geometric convergence is achieved. Steps in converging the geometry outlined as follows:

1. Complete the ICFC merging procedure for a specific osculating plane.
2. Shift the ICFC contour to fit the inner radius point defined by the throat shape.
3. Compare the outer radius of the ICFC contour with the radius defined by the capture shape.
4. If the two radii are not within tolerance limits, then iteration will be required to converge the geometry.
5. Change the throat Mach number for that local osculating plane and resolve the ICFC contour.
6. Repeat steps 1-4 until the geometry has converged. A converged solution is shown in FIG. 14. If the solution fails to converge, save nearby neighbor quantities, and interpolate these answers as initial guesses for the next round iterations. If this process does not work, then the centerbody parameter may be increased to alleviate the convergence issue.

The isolator Mach number is usually iterated upon several times until convergence is achieved. A secant-based numerical solver is used similarly to the ICFC merging procedure.

Distortion Optimization Procedure

Figure 15:
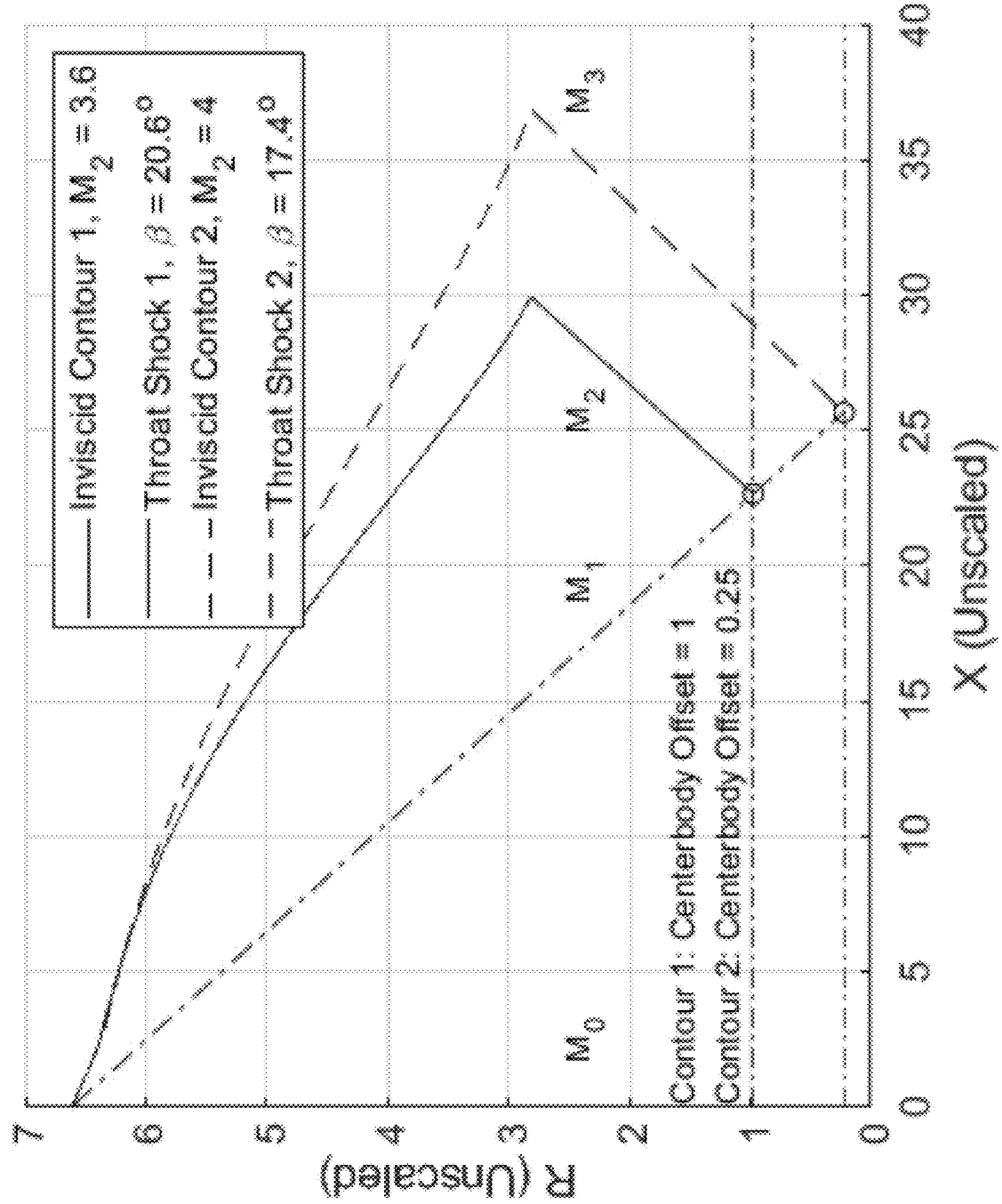
FIG. 15 illustrates the effect of changing the centerbody parameter on a geometrically converged ICFC flowfield.

In addition to the independent variables already listed, it is possible to change the shape of an individual Busemann contour by adding a radial offset component. This radial term, coined "centerbody," can be added to the radial boundary of both the intake and isolator shapes. Although the radial distance between the capture and isolator shape is a constant, the total offset radial distance impacts the parent flowfield's shock structure. The centerbody radius influences the generation of the compressive contour. If the origin point and leading edge shock angle are held constant, smaller centerbody radii cause the throat shock to become stronger, as seen in FIG. 15. If the throat shock angle is also held constant, then a smaller centerbody would force the Busemann contour to shrink. Thus, the centerbody radius becomes a third independent variable that acts to influence the ICFC contour and flowfield properties.

A third nested iteration loop can control this variable. The simultaneous iteration of three variables is computationally expensive and prone to faults. For the current inlet study it was deemed out-of-scope and deactivated. The benefit of activating this centerbody iteration loop is that it holds the potential to tune isolator Mach number and downstream throat distortion. An optimization study would proceed normally to a regular inlet generation. Initial convergence of the parent ICFC contour would be conducted by varying isolator Mach number. Then, geometric convergence would be satisfied by changing shock angle of the throat shock. Finally, the addition of a changing centerbody radius would force the parent flowfield's shock structure to change while satisfying geometric constraints. Several nonunique solutions exist for each osculating plane. The variation of the centerbody parameter essentially makes a sweep through these solutions. The solution that satisfies the target isolator Mach number is then recorded.

Capture Surface Construction

For this design code, a certain portion of the inlet is reserved to capture shocks generated by the leading edges. The shock-capture surface, or lower surface, is constructed as a means to capture all leading edge shock waves and to guide the flow into the isolator. A shock-on-lip condition ensures that on-design mass capture is sustained and predictable, which is essential for downstream components in an airbreathing engine.

The lower surface of the INlet uses a novel construction technique and provides several inherent benefits. To make the lower surface for a certain osculating plane, the upper ICFC contour is scaled down to fit the local shock structure. This similar, inviscid parallel streamline maintains the captured flow's turning angles on both the top and bottom contour. Since each Osculating Plane contains an infinite number of scalable streamlines from the Taylor-Maccoll equations, the capture surface is also defined from theory.

Designing the lower surface as a scaled-down sample of the upper surface simplifies the construction process and minimizes the internal contraction ratio. Since the lower surface provides no compression to the flow, the method does not risk over-contraction. The parallel streamline also acts as a shock-trap for the throat shock, forcing the throat shock into the notch between the curved and straight sections. Since the curvature is similar on both the top and bottom surfaces, the internal area change is gradual.

Inlet Construction

Figure 16:
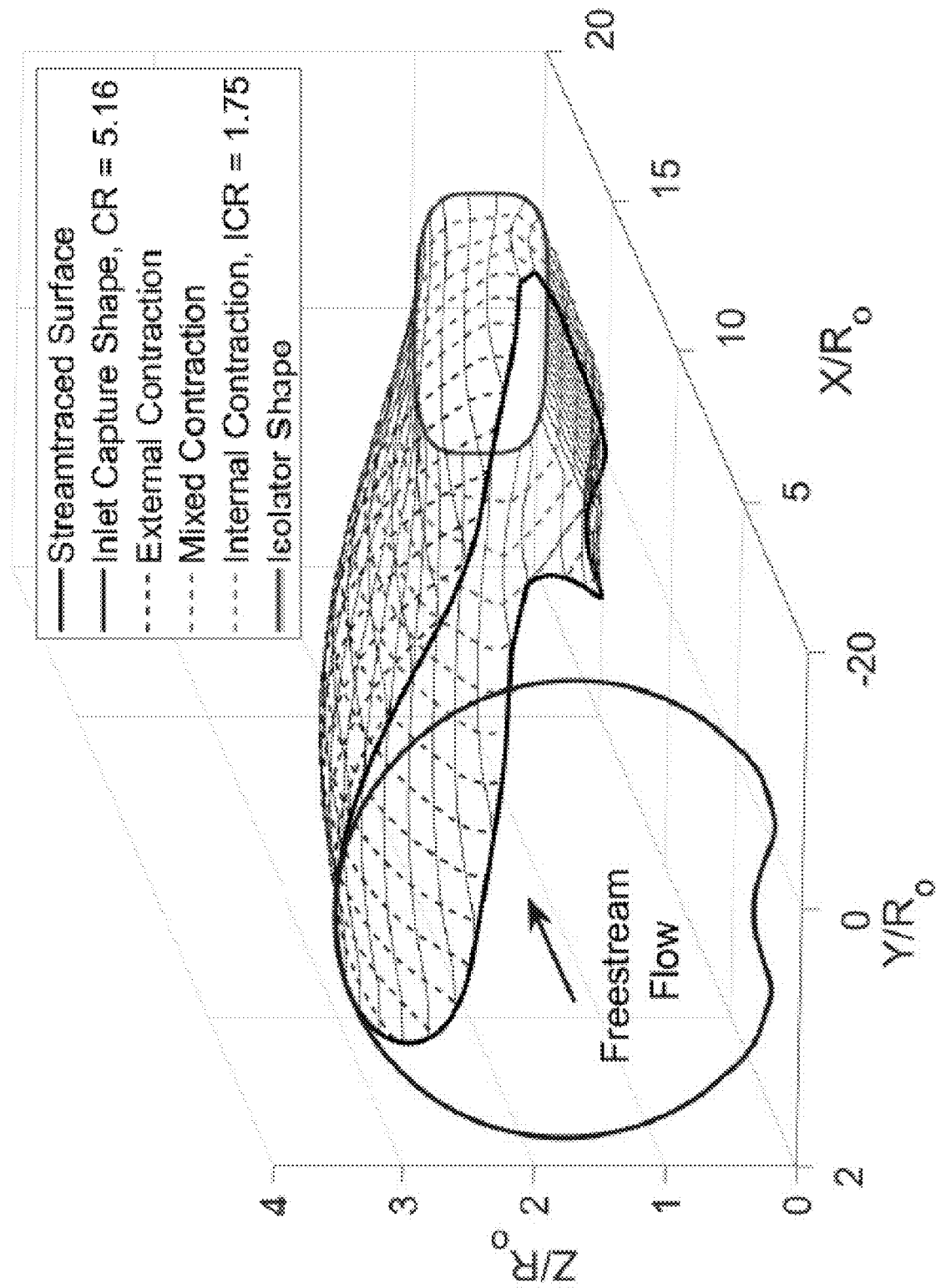
FIG. 16 is an isometric view of the high-speed intake.

Additional processing is required before the intake surface is constructed. The contours are rotated into three-dimensional space based on their original osculating plane angle. Simple geometric relationships relate the contours solved in two-dimensional Polar coordinates into three-dimensional Cartesian space. A fully constructed 3D geometry is presented in FIG. 16. The lower-surface structure creates two separate swept cut-outs, which make the inlet both aesthetically pleasing and able to automatically operate in a spillage mode. These non-traditional cut-outs act as the cowl lip and are likely to enhance starting for both on-design and off-design Mach numbers.

Overview

The code inputs are split into geometric shape and freestream flow properties. For geometric shape, intake and isolator shapes are generated by specifying individual super-ellipse exponential-factors and aspect ratios. Additionally, the user can define a target total contraction ratio. The total contraction ratio may vary substantially after a full geometric iteration, so a check must be made to re-calculate the total CR on all final inlets. The lower surface frontal projection is usually much larger than the approximated straight-line projection. It might be useful to guess a total CR 15%-25% larger than the design CR to speed convergence if it is a design parameter. The leading-edge deflection angle, which specifies the strength of the leading shock, is also defined by the user. A centerbody offset term is also definable to alleviate convergence issues. However, this term does not play a role in the intake or isolator projected cross-sectional shapes. An overview of the code block diagram is shown in FIG. 3, as discussed previously herein. FIG. 3 outlines the high-level view of the triple iteration loop that is computed for each osculating plane. It is expected that hundreds of Taylor-Maccoll calculations are performed during the creation of a new inlet geometry. A blunting tool is available for exporting curves into CAD software and does not play a part in the inlet iteration process. The total inlet can also be independently scaled after construction. The scaling process preserves the specified leading-edge radii. However, the viscous correction procedure is length dependent and must be run for each new model scaling.

User defined flow properties include freestream Mach number and a targeted isolator Mach number. The isolator Mach number does not play a role if the optimization process is not activated. The optimization procedure varies throat Mach number for each osculating slice, potentially allowing for a more uniform Mach profile at the throat. Tunnel stagnation pressure and temperature can also be used to calculate inviscid pressure distributions and temperature profiles. These are useful for calculating boundary-layer edge properties which can be used to estimate boundary layer thickness along the intake shape. Tunnel conditions also play a role in calculating other inviscid criteria such as total inlet mass flow rate, total pressure recovery, and inlet efficiency terms.

The MATLAB® streamtracing routine iterates on several solution sets to achieve a desired convergence criteria. The radial distances and offsets, which are the geometric targets, are arbitrarily defined based on the given shape. This means that the code can be modified to create external geometries, such as waveriders, or more complex asymmetrical intake shapes. These additional capabilities were not pursued for the current project. The current streamtracing routine file contains over 6,000 lines of code.

As previously noted above, though the foregoing detailed description describes certain aspects of one or more particular embodiments of the invention and investigations associated with the invention, alternatives could be adopted by one skilled in the art. For example, inlets could differ in appearance and construction from the embodiments described herein and shown in the drawings. As such, and again as was previously noted, it should be understood that the invention is not necessarily limited to any particular embodiment described herein or illustrated in the drawings.

The invention claimed is:

1. A computer-implemented method of generating a design of an inlet for a hypersonic air breathing vehicle using a processor system comprising a plurality of CPUs, the method comprising:
   solving in parallel on a plurality of free CPUs in the processor system for unique Busemann contour solutions from Taylor-Maccoll equations for conical flow in each of a plurality of osculating planes over an azimuthal sweep of a hypothetical inlet shape by changing boundary conditions; and
   generating streamtraces of the inlet, the streamtraces comprising a streamtrace of the inlet from the unique Busemann contour solution in each osculating plane, the streamtraces collectively defining a shape of the inlet; and
   generating the design of the inlet to have the shape defined by the streamtraces.

2. The computer-implemented method according to claim 1, wherein the method comprises tuning the post throat-shock Mach number of the inlet.

3. A computer processing system configured to implement the computer implemented method of claim 2, the computer processing system comprising:
   the plurality of CPUs; and
   a non-transitory computer-readable storage medium storing instructions that when executed by the plurality of CPUs cause the computer system to perform the method of claim 2.

4. An inlet of a hypersonic air-breathing vehicle produced by the method of claim 2.

5. The computer-implemented method according to claim 1, wherein the method comprises designing a shock-capture surface using a parallel-streamlines methodology.

6. A computer processing system configured to implement the computer implemented method of claim 5, the computer processing system comprising:
   the plurality of CPUs; and
   a non-transitory computer-readable storage medium storing instructions that when executed by the plurality of CPUs cause the computer system to perform the method of claim 5.

7. An inlet of a hypersonic air-breathing vehicle produced by the method of claim 5.

8. The computer-implemented method according to claim 1, wherein the method comprises designing a double cowl-lip geometry to allow flow to spill overboard.

9. A computer processing system configured to implement the computer implemented method of claim 8, the computer processing system comprising:
   the plurality of CPUs; and
   a non-transitory computer-readable storage medium storing instructions that when executed by the plurality of CPUs cause the computer system to perform the method of claim 8.

10. An inlet of a hypersonic air-breathing vehicle produced by the method of claim 8.

11. A computer processing system configured to implement the computer implemented method of claim 1, the computer processing system comprising:
    the plurality of CPUs; and
    a non-transitory computer-readable storage medium storing instructions that when executed by the plurality of CPUs cause the computer system to perform the method of claim 1.

12. An inlet of a hypersonic air-breathing vehicle produced by the method of claim 1.

* * * * *